US006894131B2

(12) United States Patent
McCullough et al.

(10) Patent No.: US 6,894,131 B2
(45) Date of Patent: May 17, 2005

(54) POLYMERIZATION PROCESS USING A METALLOCENE CATALYST SYSTEM

(75) Inventors: Laughlin G. McCullough, League City, TX (US); Agapios K. Agapiou, Humble, TX (US)

(73) Assignee: Univation Technologies, LLC, Houston, TX (US)

( * ) Notice: Subject to any disclaimer, the term of this patent is extended or adjusted under 35 U.S.C. 154(b) by 40 days.

(21) Appl. No.: 10/464,110

(22) Filed: Jun. 18, 2003

(65) Prior Publication Data

US 2003/0236364 A1 Dec. 25, 2003

Related U.S. Application Data

(63) Continuation-in-part of application No. 09/191,916, filed on Nov. 13, 1998, now Pat. No. 6,632,901.
(60) Provisional application No. 60/097,401, filed on Aug. 21, 1998.

(51) Int. Cl.$^7$ ............................. C08F 4/64; C08F 4/642; C08F 210/02
(52) U.S. Cl. ........................ 526/160; 502/152; 502/120; 526/68; 526/129; 526/165; 526/170; 526/943
(58) Field of Search ................... 526/68, 129, 160, 526/165, 170, 943, 130, 74; 502/152, 120

(56) References Cited

U.S. PATENT DOCUMENTS

| | | | |
|---|---|---|---|
| 4,588,790 A | 5/1986 | Jenkins, III et al. | 526/70 |
| 4,808,561 A | 2/1989 | Welborn, Jr. | 502/104 |
| 4,874,880 A | 10/1989 | Miya et al. | 556/53 |
| 4,897,455 A | 1/1990 | Welborn, Jr. | 526/129 |
| 4,931,417 A | 6/1990 | Miya et al. | 502/117 |
| 5,017,714 A | 5/1991 | Welborn, Jr. | 556/12 |
| 5,124,418 A | 6/1992 | Welborn, Jr. | 526/114 |
| 5,132,262 A | 7/1992 | Rieger et al. | 502/117 |
| 5,278,264 A | 1/1994 | Spaleck et al. | 526/127 |
| 5,332,706 A | 7/1994 | Nowlin et al. | 502/107 |
| 5,395,810 A | 3/1995 | Shamshoum et al. | 502/113 |
| 5,399,636 A | 3/1995 | Alt et al. | 526/129 |
| 5,405,922 A | 4/1995 | DeChillis et al. | 526/68 |
| 5,434,115 A | 7/1995 | Yamada et al. | 502/103 |
| 5,441,920 A | 8/1995 | Welborn, Jr. | 502/103 |
| 5,473,028 A | 12/1995 | Nowlin et al. | 526/114 |
| 5,543,373 A | 8/1996 | Winter et al. | 502/103 |
| 5,594,081 A | 1/1997 | Uchino et al. | 526/127 |
| 5,763,543 A | 6/1998 | Muhle et al. | 526/68 |
| 6,069,213 A | 5/2000 | Nemzek et al. | 526/113 |
| 6,201,076 B1 | 3/2001 | Etherton et al. | 526/74 |
| 6,245,868 B1 | 6/2001 | Agapiou et al. | 526/88 |
| 6,303,718 B1 | 10/2001 | Becke et al. | 526/160 |
| 2002/0143125 A1 | 10/2002 | Kaminsky et al. | 526/160 |

FOREIGN PATENT DOCUMENTS

| | | |
|---|---|---|
| AU | 718385 | 1/1998 |
| DE | 4332009 A1 | 3/1995 |
| DE | 19706027 A1 | 8/1998 |
| EP | 0200351 A2 | 3/1986 |
| EP | 0519746 A1 | 12/1992 |
| EP | 0705849 A1 | 4/1996 |
| EP | 1213304 A1 | 6/2002 |
| WO | WO 96/08520 | 3/1996 |
| WO | WO 96/11960 | 4/1996 |
| WO | WO 96/11961 | 4/1996 |
| WO | WO97/07141 | 2/1997 |

OTHER PUBLICATIONS

E.F. Murphy et al. in *Organometallic Fluorides: Compounds Containing Carbon—Metal—Fluorine Fragments of d–Block Metals*, 97 Chem. Rev. 3425–3468 (1997).
Kaminsky, "*Highly active metallocene catalysts for olefin polymerization*" J. Chem. Soc., Dalton Trans., (1998) 1413–1418.
Garbassi, et al., "*XPS study of metallocene based catalysts for the polymerization of ethylene*" Journal of Molecular Catalysts A: Chemical 101 (1995) 199–209.
Murphy, et al., *Synthesis and spectroscopic characterization of a series of substituted cylopentadienyl Group 4 fluorides; crystal structure of the acetylacetonato complex [(acac)$_2$(η–C$_5$Me$_5$)Zr(µ–F)SnMe$_3$Cl]* J. Chem. Soc., Dalton Trans., (1996) 1983–1987.
W. Kaminsky, et al., *Fluorinated Half–Sandwich Complexes as Catalysts in Syndiospecific Styrene Polymerization*, 30 (25) MACROMOLECULES 7647–7650 (1997).
A. Herzog, et al., *Reactions of (η$^5$–C$_5$Me$_5$)ZrF$_3$, (η$^5$–C$_5$Me$_4$Et)ZrF$_3$, (η$^5$–C$_5$M4$_5$)$_2$ZrF$_2$, (η$^5$–C$_5$Me$_5$)HfF$_3$, and (η$^5$–C$_5$Me$_5$)TaF$_4$ with AlMe$_3$, Structure of the First Hafnium–Aluminum–Carbon Cluster*, 15 ORGANOMETALLICS 909–917 (1996).

Primary Examiner—Caixia Lu
(74) Attorney, Agent, or Firm—Kevin M. Faulkner

(57) ABSTRACT

Provided is a process for polymerizing olefins in the presence of a metallocene catalyst compound having at least one fluoride or fluorine containing leaving group. More particularly, the present invention is directed to a process and catalyst composition having improved reactor performance, reducing or eliminating the need for antifouling additives to the catalyst composition and/or the reactor. In one embodiment, the invention is a process of polymerizing olefins comprising contacting ethylene and at least one comonomer with a supported catalyst system comprising a metallocene catalyst compound, the metallocene catalyst compound comprising at least one fluoride ion or fluorine containing leaving group; and wherein the supported catalyst system comprises an inorganic oxide support having an average particle size of from 35 µm or less and a pore volume of from 1 to 2 cm$^3$/g. The polymer product resulting therefrom is, in one embodiment, a copolymer having a density in the range of from 0.910 g/cm$^3$ to 0.940 g/cm$^3$; a molecular weight distribution of from 1.8 to 4; and an I$_2$ of from 0.1 dg/min to 10 dg/min and is suitable for such articles as films.

55 Claims, No Drawings

US 6,894,131 B2

POLYMERIZATION PROCESS USING A METALLOCENE CATALYST SYSTEM

CROSS-REFERENCE TO RELATED APPLICATIONS

The present application is a Continuation-In-Part Application of U.S. Ser. No. 09/191,916, filed on Nov. 13, 1998, now U.S. Pat. No. 6,632,901 which claims priority to Provisional U.S. Application Ser. No. 60/097,401 filed Aug. 21, 1998.

FIELD OF THE INVENTION

The present invention relates to a polymerization process using an improved metallocene catalyst system. The catalyst system comprises a metallocene compound having at least one fluoride (fluoride ion) leaving group or fluorine containing leaving group. At least one leaving group is abstractable from the metallocene type compound to render it catalytically active in the polymerization of olefins.

BACKGROUND OF THE INVENTION

Advances in polymerization and catalysis have resulted in the ability to produce many new polymers having improved physical and chemical properties useful in a wide variety of superior products and applications. With the development of new catalysts the choice of polymerization process (solution, slurry, high pressure or gas phase) for producing a particular polymer have been greatly expanded. Also, advances in polymerization technology has provided more efficient, highly productive and economically enhanced processes. Especially illustrative of these advances is the development of the technology field utilizing metallocene catalyst systems.

As with a new technology field, particularly in the polyolefins industry, a small savings in cost often determines whether a commercial endeavor is even feasible. This aspect in the metallocene technology field is evident by the number of participants in the industry looking for new ways to reduce cost. In particular, there has been tremendous focus in the industry on developing new and improved metallocene catalyst systems. Some have focused on designing the catalyst systems to produce new polymers, others on improved operability, and many more on improving catalyst productivity. The productivity of a catalyst, that is the amount of polymer produced per gram of the catalyst, usually is the key economic factor that can make or break a new commercial development in the polyolefin industry. Reactor operability—lack of fouling and sheeting, etc.—of the polymerization reactor is also a major concern for polyolefin producers. Reducing the occurrence of reactor fouling has commercial benefits in reduced down time for the reactor and improved output of polyolefin resin, as well as higher quality resin.

From the early stages in the metallocene technology field, beginning with the discovery of the utility of alumoxane as a cocatalyst in the early 1980's, to the discovery of substitutions on the bulky ligands of the metallocene compounds, through the development of non-coordinating anions, and today with the ever increasing number of new metallocene bulky ligand compounds, catalyst productivity has been a primary focus.

Evidence of this can be seen in this subset of the art discussing various metallocene catalyst compounds and catalyst systems described in U.S. Pat. Nos. 4,530,914, 4,542,199, 4,769,510, 4,871,705, 4,937,299, 5,017,714, 5,055,438, 5,096,867, 5,130,030, 5,120,867, 5,124,418, 5,198,401, 5,210,352, 5,229,478, 5,264,405, 5,278,264, 5,278,119, 5,304,614, 5,324,800, 5,347,025, 5,350,723, 5,384,299, 5,391,790, 5,391,789, 5,399,636, 5,408,017, 5,491,207, 5,455,366, 5,534,473, 5,539,124, 5,554,775, 5,621,126, 5,684,098, 5,693,730, 5,698,634, 5,710,297, 5,712,354, 5,714,427, 5,714,555, 5,728,641, 5,728,839, 5,753,577, 5,767,209, 5,770,753, 5,770,664 and 5,814,574, European Patent Nos. EP-A-0 591 756, EP-A-0 520 732, EP-A-0 420 436, EP-B1 0 485 822, EP-B1 0 485 823, EP-A2-0 743 324 and EP-B1 0 518 092 and PCT Publication Nos. WO 91/04257, WO 92/00333, WO 93/08221, WO 93/08199, WO 94/01471, WO 96/20233, WO 97/15582, WO 97/19959, WO 97/46567, WO 98/01455, WO 98/06759 and WO 98/011144.

There are many more examples in the metallocene art. However, there is a small subset that discuss the importance of the leaving group, the ligand capable of being abstracted and rendering the metallocene catalyst system capable of polymerizing olefins. Some in art discuss using chloride or methyl leaving groups, for example U.S. Pat. Nos. 4,542,199 and 4,404,344 respectively.

Much of the metallocene art discuss the use generally of halogens as leaving groups. For example, EP-A2 0 200 351 mentions in a laundry list of possibilities, a few compounds having fluoride leaving groups, as does EP-A1 0 705 849. However, although halogens are typically discussed in much of the art, the predominant focus has been on chlorine as a leaving group.

There are some disclosures and exemplifications of metallocene compounds having fluoride groups in the art, for example:

E. F. Murphy, et al., "Synthesis and spectroscopic characterization of a series of substituted cyclopentadienyl Group 4 fluorides; crystal structure of the acetlacetonato complex [(acac)$_2$($\eta^5$-C$_5$Me$_5$)Zr($\mu$-F)SnMe$_3$Cl]", DALTON 1983 (1996), describes the synthesis of some mono- and di-substituted cyclopentadienyl Group 4 fluoride compounds.

Herzog, et al., "Reactions of ($\eta^5$-C$_5$Me$_5$)ZrF$_3$, ($\eta^5$-C$_5$Me$_4$Et)ZrF$_3$, ($\eta^5$-C$_5$M4$_5$)$_2$ZrF$_2$, ($\eta^5$-C$_5$Me$_5$)HfF$_3$, and ($\eta^5$-C$_5$Me$_5$)TaF$_4$ with AlMe$_3$. Structure of the First Hafnium-Aluminum-Carbon Cluster", 15 ORGANOMETALLICS 909–917 (1996), describes the reactions of various compounds having fluoride leaving groups with an aluminum compound.

F. Garbassi, et al., JOURNAL OF MOLECULAR CATALYSIS A: CHEMICAL 101 199–209 (1995) illustrates the binding energy of various leaving groups on zirconium compounds. In particular this article shows that a catalyst system of bis(cyclopentadienyl)zirconium dichloride in the polymerization of ethylene is more active than the di-fluoride analog.

PCT publication WO 97/07141 describes a number of metallocene compounds with fluoride leaving groups. This publication exemplifies their use with methylalumoxane in the polymerization of styrene and shows a single bis(cyclopentadienyl)titanium mono-fluoride having a very low productivity. Also, Kaminsky, et al., "Fluorinated Half-Sandwich Complexes as Catalysts in Syndiospecific Styrene Polymerization", 30(25) MACROMOLECULES 1997 describes that unbridged mono-cyclopentadienyl titanium trifluoride catalysts have a higher activity than the chlorinated compounds in the polymerization of styrene in the temperature range of from 10° C. to 70° C.

German publication DE 43 32 009 A1 describes a process for making organometallic fluorides by reacting an organometallic halide with tin fluoride. This publication appears to show that an unsupported catalyst system of methylalumoxane and a bis(pentamethylcyclopentadienyl)zirconium dichloride has a lower homopolyethylene productivity compared with double the amount of the difluoride at 70° C.

Considering the discussion above there is still a need for higher productivity catalyst systems capable of providing the efficiencies necessary for implementing commercial polyolefin process. Further, it has been found, especially in gas phase fluidized bed processes, that reactor performance (presence or absence of reactor fouling, sheeting, etc.) is an issue when using supported metallocene catalysts. Secondary additives or support "surface modifiers" are often used to reduce fouling and hence improve commercial performance of the reactor. Addition of these surface modifiers, however, adds cost and complexity to the polymerization process. Thus, it would be highly advantageous to have a polymerization process and catalyst system capable of producing polyolefins with improved catalyst productivities and reactor performance.

SUMMARY OF THE INVENTION

This invention provides for a process for polymerizing olefins in the presence of a metallocene catalyst compound having at least one fluoride or fluorine containing leaving group. More particularly, the present invention is directed to a process and catalyst composition having improved reactor performance, reducing or eliminating the need for anti-fouling additives to the catalyst composition and/or the reactor.

In one embodiment, the invention is a process of polymerizing olefins comprising contacting: (a) ethylene and at least one comonomer selected from the group consisting of $C_4$ to $C_8$ alpha olefins; and (b) a supported catalyst system comprising a metallocene catalyst compound, the metallocene catalyst compound consisting of a substituted unbridged bis-cyclopentadienyl zirconocene catalyst compound comprising at least one fluoride ion or fluorine containing leaving group; wherein the supported catalyst system comprises a silica support having an average particle size of from less than 35 µm and a pore volume of from 1 to 2 $cm^3/g$. The polymer product resulting therefrom is, in one embodiment, a copolymer having a density in the range of from 0.910 $g/cm^3$ to 0.940 $g/cm^3$; a molecular weight distribution of from 1.8 to 4; and an $I_2$ of from 0.1 dg/min to 10 dg/min and is suitable for such articles as films.

DETAILED DESCRIPTION OF THE INVENTION

Introduction

The invention is directed toward a process for polymerizing olefins in the presence of a metallocene catalyst compound having at least one fluoride or fluorine containing leaving group, and preferably, a gas phase process for polymerizing ethylene and $C_3$ to $C_{20}$ olefins using a supported metallocene comprising at least one fluoride leaving group, wherein the supported "fluorided" metallocene may further comprise a small diameter (e.g., 35 µm or less) size inorganic oxide support matrix.

It has been surprisingly discovered that fluoride or fluorine containing leaving groups yield metallocene catalyst systems having improved activities, productivities and reduced reactor fouling. It was especially surprising because it is well known that a fluoride leaving group is more strongly bonded to the metal than any other of the halogens. Meaning that it would be more difficult to abstract a fluoride or fluorine containing leaving group and thus, reducing the activity. In addition, typically when a metallocene catalyst system is in a supported form, the activity as well as the productivity of the supported catalyst system decreases. Surprisingly, supporting the organometallic catalyst compounds having a fluoride or a fluorine containing leaving group, the activity and productivity loss is reduced or virtually eliminated. Further, it has been found that a class of these fluorided metallocenes improve polymerization reactor operability by reducing fouling.

Metallocene Catalyst Compounds

Metallocene catalyst compounds include half (one cyclopentadienyl bound to a metal center) and full (two cyclopentadienyls bound to a metal center) sandwich compounds having one or more cyclopentadienyl ligands or ligands isolobal to cyclopentadienyl ("Cp") bonded to at least one metal atom, and one or more leaving group(s) bonded to the at least one metal atom. For the purposes of this patent specification and appended claims the term "leaving group" is any ligand that can be abstracted from a metallocene catalyst compound to form a metallocene catalyst cation capable of polymerizing one or more olefins. In the present invention, a particularly useful metallocene is a fluorided metallocene, or a metallocene that comprises at least on fluorine ion leaving group or fluorine containing leaving group.

The Cp ligands are generally represented by one or more bonding systems comprising π bonds that can be open systems or ring systems or fused system(s) or a combination thereof. These ring(s) or ring system(s) are typically composed of atoms selected from Groups 13 to 16 atoms, preferably the atoms are selected from the group consisting of carbon, nitrogen, oxygen, silicon, sulfur, phosphorous, boron and aluminum or a combination thereof. Most preferably the ring(s) or ring system(s) are composed of carbon atoms such as but not limited to those cyclopentadienyl ligands or cyclopentadienyl-type ligand structures (structures isolobal to cyclopentadienyl). The metal atom is preferably selected from Groups 3 through 16 and the lanthanide or actinide series of the Periodic Table of Elements, and selected from Groups 4 through 12 in another embodiment, and selected from Groups 4, 5 and 6 in yet a more particular embodiment, and selected from Group 4 atoms in yet another embodiment.

In one embodiment, the metallocene catalyst compounds of the invention are unbridged bis-cyclopentadienyl metallocene compounds represented by the formula:

$$L^A L^B MQ_n \qquad (I)$$

wherein each $L^A$ and $L^B$ are bound to the metal center M, and each Q is bound to the metal center, n being 0 or an integer from 1 to 4, preferably 1 or 2, and most preferably 2.

In formula (I), M is selected from the group consisting of Groups 3 through 12 atoms and lanthanide Group atoms in one embodiment; and selected from the group consisting of Groups 3 through 10 atoms in a more particular embodiment, and selected from the group consisting of Sc, Ti, Zr, Hf, V, Nb, Ta, Mn, Re, Fe, Ru, Os, Co, Rh, Ir, and Ni in yet a more particular embodiment; and selected from the group consisting of Groups 4, 5 and 6 atoms in yet a more particular embodiment, and a Ti, Zr, Hf atoms in yet a more particular embodiment, Zr and Hf in yet a more particular embodiment, and Zr in yet a more particular embodiment. The oxidation state of the metal atom "M" may range from 0 to +7 in one embodiment; and in a more particular embodiment, is +1, +2, +3, +4 or +5; and in yet a more particular embodiment is +2, +3 or +4. The groups bound the metal atom "M" are such that the compounds described below in the formulas and structures are electrically neutral, unless otherwise indicated. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

The $L^A$ and $L^B$ groups of formula (I) are Cp ligands, such as cycloalkadienyl ligands and heterocyclic analogues. The Cp ligands typically comprise atoms selected from the group consisting of Groups 13 to 16 atoms, and more particularly, the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members. Even more particularly, the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4$Ind"), substituted versions thereof (as described in more detail below), and heterocyclic versions thereof.

Independently, each $L^A$ and $L^B$ may be unsubstituted or substituted with a combination of substituent groups R. Non-limiting examples of substituent groups R include one or more from the group selected from hydrogen, or linear, branched, cyclic alkyl radicals, or alkenyl, alkynl or aryl radicals, or combination thereof. In a preferred embodiment, substituent groups R have up to 50 non-hydrogen atoms, preferably from 1 to 30 carbon atoms that can also be substituted with halogens or heteroatoms or the like. Non-limiting examples of alkyl or aryl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other halogenated hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstituted boron radicals including dimethylboron for example; and disubstituted Group 15-containing radicals including dimethylamine, dimethylphosphine, diphenylamine, methylphenylphosphine, Group 16-containing radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a bond to the metal M.

The leaving groups Q of formula (I) are monoanionic labile ligands bound to M. Depending on the oxidation state of the metal, the value for n is 0, 1 or 2 such that formula (I) above represents a neutral metallocene catalyst compound, or a positively charged compound.

In this invention, at least one Q, or the leaving group in the above formula (I) is a fluoride ion (F) or a fluorine containing ligand, preferably a fluoride ion. Examples of fluorine containing ligands include fluorinated alkyls, fluorinated alkoxides, fluorinated alkylaryls or fluorinated unsaturated hydrocarbons. Further non-limiting examples of fluorine containing ligands include trifluoromethyl, trifluoroethyl, pentafluorophenyl, monofluorovinyl, and the like or combinations thereof. In the most preferred embodiment of the invention, the metallocene catalyst compounds of the invention have at least one leaving group Q that is a fluoride ion, preferably all the leaving groups are fluoride ions.

Non-limiting examples of other Q leaving groups include $C_1$ to $C_{10}$ alkyls, alkoxides, amines, alkylamines, phosphines, alkylphosphines, ethers, carboxylates, dienes, hydrocarbyl radicals having from 1 to 20 carbon atoms, $C_6$ to $C_{12}$ aryls, $C_7$ to $C_{20}$ alkylaryls, $C_7$ to $C_{20}$ arylalkyls, hydrides or halogen ions (Cl, Br, I) and the like or a combination thereof.

In one embodiment, the metallocene catalyst compounds of the invention include those of formula (I) where $L^A$ and $L^B$ are bridged to each other by a bridging group, A. These bridged compounds are referred to as bridged metallocene catalyst compounds and can be represented by the formula (II)

$$L^A(A)L^B MQ_n \qquad (II)$$

wherein each $L^A$ and $L^B$ are bound to the metal center M, and each Q is bound to the metal center, n being 0 or an integer from 1 to 4, preferably 1 or 2, and most preferably 2; the groups $L^A$, $L^B$, M and Q are as defined in (I); and the divalent bridging group A is bound to both $L^A$ and $L^B$ through at least one bond or divalent moiety, each.

Non-limiting examples of bridging group A from formula (II) include divalent bridging groups containing at least one Group 13 to 16 atom, often referred to a divalent moiety such, as but not limited to, at least one of a carbon, oxygen, nitrogen, silicon, boron, germanium and tin atom or a combination thereof. Preferably, bridging group A contains a carbon, silicon or germanium atom, most preferably A contains at least one silicon atom or at least one carbon atom. The bridging group A may also contain substituent groups R as defined above including halogens. More particularly, non-limiting examples of bridging group A may be represented by R'$_2$C=, R'$_2$Si=, —(R')$_2$Si(R')$_2$Si—, —(R')$_2$Si (R')$_2$C—, R'$_2$Ge=, —(R')$_2$Si(R')$_2$Ge—, —(R')$_2$Ge(R')$_2$ C—, R'N=, R'P=, —(R')$_2$C(R')N—, —(R')$_2$C(R')P—, —(R')$_2$Si(R')N—, —(R')$_2$Si(R')P—, —(R')$_2$Ge(R')N—, —(R')$_2$Ge(R')P—, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atom, substituted Group 16 atom, or halogen; or two or more R' may be joined to form a ring or ring system; and independently, each Q can be the same or different is a hydride, substituted or unsubstituted, linear, cyclic or branched, hydrocarbyl having from 1 to 30 carbon atoms, halogen, alkoxides, aryloxides, amides, phosphides, or any other univalent anionic ligand or combination thereof.
In another aspect of the invention, the fluorided metallocene catalyst compound of the invention can be described more particularly in structures (IIIa)–(IIIj):
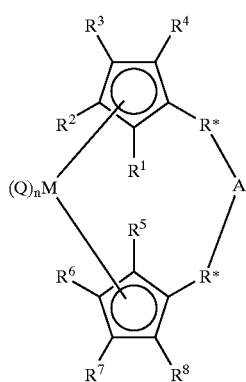
(IIIa)
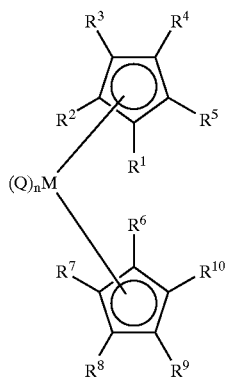
(IIIb)
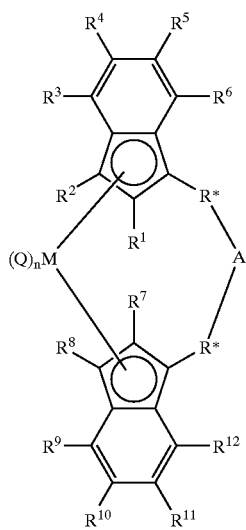
(IIIc)
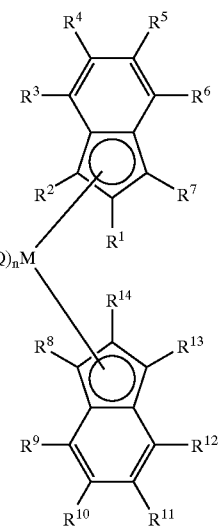
(IIId)
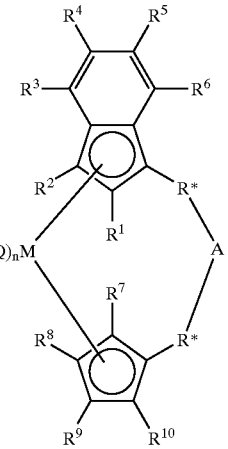
(IIIe)
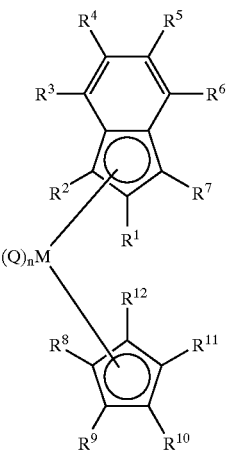
(IIIf)

-continued

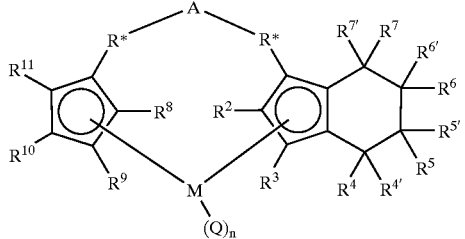
(IIIg)

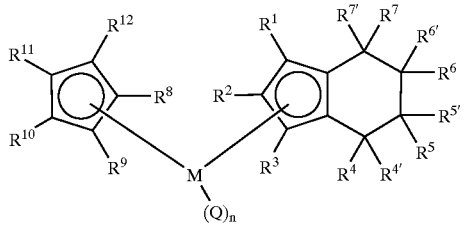
(IIIh)

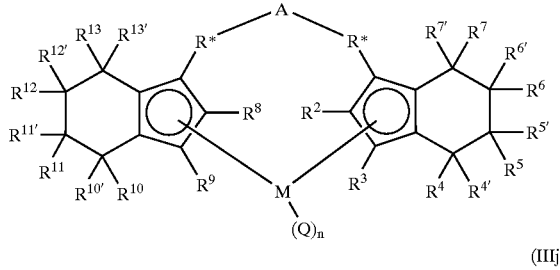
(IIIi)

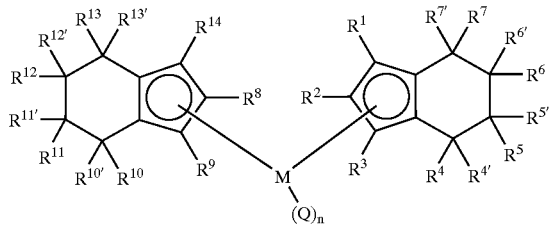
(IIIj)

wherein in structures M is selected from the group consisting of Group 4 to Group 6 atoms in one embodiment; and selected from the group consisting of Group 4 atoms in yet a more particular embodiment, and is Zr or Hf in yet a more particular embodiment; and is Zr in yet a more particular embodiment;

A is as described above for (A) in structure (II), and more particularly, selected from the group consisting of a chemical bond, —O—, —S—, —SO$_2$—, —NR—, =SiR$_2$, =GeR$_2$, =SnR$_2$, —R$_2$SiSiR$_2$—, RP=, C$_1$ to C$_{12}$ alkylenes, substituted C$_1$ to C$_{12}$ alkylenes, divalent C$_4$ to C$_{12}$ cyclic hydrocarbons and substituted and unsubstituted aryl groups in one embodiment; and selected from the group consisting of C$_5$ to C$_8$ cyclic hydrocarbons, —CH$_2$CH$_2$—, =CR$_2$ and =SiR$_2$ in a more particular embodiment; wherein and R is selected from the group consisting of alkyls, cycloalkyls, aryls, alkoxys, fluoroalkyls and heteroatom-containing hydrocarbons in one embodiment; and R is selected from the group consisting of C$_1$ to C$_6$ alkyls, substituted phenyls, phenyl, and C$_1$ to C$_6$ alkoxys in a more particular embodiment; and R is selected from the group consisting of methoxy, methyl, phenoxy, and phenyl in yet a more particular embodiment; each Q is as described above in (I), wherein at least one Q is a fluoride ion or fluorine containing group; and each is a fluoride ion in a particular embodiment;

n is an integer from 1 to 4, and from 1 to 3 in another embodiment, and 1 or 2 in yet another embodiment;

each R* is independently: selected from the group consisting of a chemical bond, hydrocarbylenes and heteroatom-containing hydrocarbylenes in one embodiment; and selected from the group consisting of a chemical bond, alkylenes, substituted alkylenes and heteroatom-containing hydrocarbylenes in another embodiment; and selected from the group consisting of a chemical bond, C$_1$ to C$_{12}$ alkylenes, C$_1$ to C$_{12}$ substituted alkylenes, and C$_1$ to C$_{12}$ heteroatom-containing hydrocarbylenes in a more particular embodiment; and selected from the group consisting of a chemical bond, C$_1$ to C$_4$ alkylenes in yet a more particular embodiment; and wherein both R* groups are identical in another embodiment;

R$^1$ through R$^{14}$ are independently: selected from the group consisting of hydrogen radical, halogen radicals, C$_1$ to C$_{12}$ alkyls, C$_2$ to C$_{12}$ alkenyls, C$_6$ to C$_{12}$ aryls, C$_7$ to C$_{20}$ alkylaryls, C$_1$ to C$_{12}$ alkoxys, C$_1$ to C$_{12}$ fluoroalkyls, C$_6$ to C$_{12}$ fluoroaryls, and C$_1$ to C$_{12}$ heteroatom-containing hydrocarbons and substituted derivatives thereof in one embodiment; selected from the group consisting of hydrogen radical, fluorine radical, chlorine radical, bromine radical, C$_1$ to C$_6$ alkyls, C$_2$ to C$_6$ alkenyls, C$_7$ to C$_{18}$ alkylaryls, C$_1$ to C$_6$ fluoroalkyls, C$_2$ to C$_6$ fluoroalkenyls, C$_7$ to C$_{18}$ fluoroalkylaryls in a more particular embodiment; and hydrogen radical, fluorine radical, chlorine radical, methyl, ethyl, propyl, isopropyl, butyl, isobutyl, tertiary butyl, hexyl, phenyl, 2,6-di-methylpheyl, and 4-tertiarybutylpheyl groups in yet a more particular embodiment; and C$_1$ to C$_4$ alkyls in yet a more particular embodiment; wherein in yet another embodiment, adjacent R groups may form a ring, either saturated, partially saturated, or completely saturated.

The embodiments encompassed by the structures (I) through (IIIj) above are uncharged species in a particular embodiment, and are substituted by Q in such a manner as to satisfy a net charge of zero for the catalyst compounds; in another embodiment, the structures include monovalent, or positively charged species, wherein the catalyst compound is the reaction product of the uncharged catalyst compound and an activator species, for example, and may include the reaction product of the activator as an anion species associated thereto.

It is contemplated that the metallocene catalysts components described above include their structural or optical or enantiomeric isomers (racemic mixture), and may be a pure enantiomer in one embodiment. Further, as used herein, a single, bridged, asymmetrically substituted metallocene catalyst component having a racemic and/or meso isomer does not, itself, constitute at least two different bridged, metallocene catalyst components.

The "metallocene catalyst component" useful in the present invention may comprise any combination of any "embodiment" described herein, for example, any combination of L$^A$, L$^B$, M, Q, A and R (R$^1$–R$^{14}$) group.

In a preferred embodiment of the invention, the fluorided metallocene catalyst component comprises structures (IIIb), (IIId), (IIIf), (IIIh), and (IIIj).

Activator and Activation Methods for the Metallocene Catalyst Compounds

As used herein, the term "activator" is defined to be any compound or combination of compounds, supported or unsupported, which can activate a single-site catalyst compound (e.g., metallocenes, Group 15-containing catalysts, etc.), such as by creating a cationic species from the catalyst component. Typically, this involves the abstraction of at least one leaving group (X group in the formulas/structures above) from the metal center of the catalyst component. The catalyst components of the present invention are thus activated towards olefin polymerization using such activators. Embodiments of such activators include Lewis acids such as cyclic or oligomeric poly(hydrocarbylaluminum oxides) and so called non-coordinating activators ("NCA") (alternately, "ionizing activators" or "stoichiometric activators"), or any other compound that can convert a neutral metallocene catalyst component to a metallocene cation that is active with respect to olefin polymerization.

More particularly, it is within the scope of this invention to use Lewis acids such as alumoxane (e.g., "MAO"), modified alumoxane (e.g., "TIBAO"), and alkylaluminum compounds as activators, and/or ionizing activators (neutral or ionic) such as tri(n-butyl)ammonium tetrakis (pentafluorophenyl)boron and/or a trisperfluorophenyl boron metalloid precursors to activate desirable metallocenes described herein. MAO and other aluminum-based activators are well known in the art. Ionizing activators are well known in the art and may be associated with or bound to a support, either in association with the catalyst component (e.g., metallocene) or separate from the catalyst component.

Examples of neutral ionizing activators include Group 13 tri-substituted compounds, in particular, tri-substituted boron, tellurium, aluminum, gallium and indium compounds, and mixtures thereof. The three substituent groups are each independently selected from alkyls, alkenyls, halogen, substituted alkyls, aryls, arylhalides, alkoxy and halides. In one embodiment, the three groups are independently selected from halogen, mono or multicyclic (including halosubstituted) aryls, alkyls, and alkenyl compounds and mixtures thereof. In another embodiment, the three groups are selected from alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls), and combinations thereof. In yet another embodiment, the three groups are selected from alkyls having 1 to 4 carbon groups, phenyl, naphthyl and mixtures thereof. In yet another embodiment, the three groups are selected from highly halogenated alkyls having 1 to 4 carbon groups, highly halogenated phenyls, and highly halogenated naphthyls and mixtures thereof. By "highly halogenated", it is meant that at least 50% of the hydrogens are replaced by a halogen group selected from fluorine, chlorine and bromine. In yet another embodiment, the neutral stoichiometric activator is a tri-substituted Group 13 compound comprising highly fluorided aryl groups, the groups being highly fluorided phenyl and highly fluorided naphthyl groups.

In another embodiment, the neutral tri-substituted Group 13 compounds are boron compounds such as a trisperfluorophenyl boron, trisperfluoronaphthyl boron, tris(3,5-di (trifluoromethyl)phenyl)boron, tris(di-t-butylmethylsilyl) perfluorophenylboron, and other highly fluorinated trisarylboron compounds and combinations thereof, and their aluminum equivalents.

Illustrative, not limiting examples of ionic ionizing activators include trialkyl-substituted ammonium salts such as triethylammonium tetra(phenyl)boron, tripropylammonium tetra(phenyl)boron, tri(n-butyl)ammonium tetra(phenyl) boron, trimethylammonium tetra(p-tolyl)boron, trimethylammonium tetra(o-tolyl)boron, tributylammonium tetra (pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra (pentafluorophenyl)boron, tri(n-butyl)ammonium tetra(o-tolyl)boron and the like; N,N-dialkyl anilinium salts such as N,N-dimethylanilinium tetra(phenyl)boron, N,N-diethylanilinium tetra(phenyl)boron, N,N-2,4,6-pentamethylanilinium tetra(phenyl)boron and the like; dialkyl ammonium salts such as di-(isopropyl)ammonium tetra(pentafluorophenyl)boron, dicyclohexylammonium tetra(phenyl)boron and the like; triaryl carbonium salts (trityl salts) such as triphenylcarbonium tetra(phenyl)boron and triphenylcarbonium tetra(pentafluorophenyl)boron; and triaryl phosphonium salts such as triphenylphosphonium tetra(phenyl)boron, triphenylphosphonium tetra (pentafluorophenyl)boron, tri(methylphenyl)phosphonium tetra(phenyl)boron, tri(dimethylphenyl)phosphonium tetra (phenyl)boron and the like, and their aluminum equivalents.

In yet another embodiment of the activator of the invention, an alkylaluminum can be used in conjunction with a heterocyclic compound. The heterocyclic compound includes at least one nitrogen, oxygen, and/or sulfur atom, and includes at least one nitrogen atom in a particular embodiment. The heterocyclic compound includes 4 or more ring members in one embodiment, and 5 or more ring members in another embodiment.

The heterocyclic compound for use as an activator with an alkylaluminum may be unsubstituted or substituted with one or a combination of substituent groups. Examples of suitable substituents include halogen, alkyl, alkenyl or alkynyl radicals, cycloalkyl radicals, aryl radicals, aryl substituted alkyl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or any combination thereof. The substituents groups may also be substituted with halogens, particularly fluorine or bromine, heteroatoms or the like.

Non-limiting examples of hydrocarbon substituents include methyl, ethyl, propyl, butyl, pentyl, hexyl, cyclopentyl, cyclohexyl, benzyl or phenyl groups and the like, including all their isomers, for example tertiary butyl, isopropyl, and the like. Other examples of substituents include fluoromethyl, fluoroethyl, difluoroethyl, iodopropyl, bromohexyl or chlorobenzyl.

In one embodiment, the heterocyclic compound is unsubstituted. In another embodiment one or more positions on the heterocyclic compound are substituted with a halogen atom or a halogen atom containing group, for example a halogenated aryl group. In one embodiment the halogen is selected from chlorine, bromine and fluorine, and selected from fluorine and bromine in another embodiment, and the halogen is fluorine in yet another embodiment.

Non-limiting examples of heterocyclic compounds utilized in the activator of the invention include substituted and unsubstituted pyrroles, imidazoles, pyrazoles, pyrrolines, pyrrolidines, purines, carbazoles, and indoles, phenyl indoles, 2,5-dimethyl pyrroles, 3-pentafluorophenyl pyrrole, 4,5,6,7-tetrafluoroindole or 3,4-difluoropyrroles.

In one embodiment, the heterocyclic compound described above is combined with an alkylaluminum or an alumoxane to yield an activator compound which, upon reaction with a catalyst component, for example a metallocene, produces an active polymerization catalyst. Non-limiting examples of suitable alkylaluminums include trimethylaluminum, triethylaluminum, triisobutylaluminum, tri-n-hexylaluminum, tri-n-octylaluminum, tri-iso-octylaluminum, triphenylaluminum, and combinations thereof.

Other activators include those described in WO 98/07515 such as tris (2,2',2"-nonafluorobiphenyl)fluoroaluminate. Combinations of activators are also contemplated by the invention, for example, alumoxanes and ionizing activators in combinations. Other activators include aluminum/boron complexes, perchlorates, periodates and iodates including their hydrates; lithium (2,2'-bisphenyl-ditrimethylsilicate) .4THF; silylium salts in combination with a non-coordinating compatible anion. Also, methods of activation such as using radiation, electro-chemical oxidation, and the like are also contemplated as activating methods for the purposes of rendering the neutral bulky ligand metallocene-type catalyst compound or precursor to a bulky ligand metallocene-type cation capable of polymerizing olefins. Other activators or methods for activating a bulky ligand metallocene-type catalyst compound are described in for example, U.S. Pat. Nos. 5,849,852, 5,859,653 and 5,869,723 and WO 98/32775.

In general, the activator and catalyst component(s) are combined in mole ratios of activator to catalyst component from 1000:1 to 0.1:1, and from 300:1 to 1:1 in another embodiment, and from 150:1 to 1:1 in yet another embodiment, and from 50:1 to 1:1 in yet another embodiment, and from 10:1 to 0.5:1 in yet another embodiment, and from 3:1 to 0.3:1 in yet another embodiment, wherein a desirable range may include any combination of any upper mole ratio limit with any lower mole ratio limit described herein. When the activator is a cyclic or oligomeric poly(hydrocarbylaluminum oxide) (e.g., "MAO"), the mole ratio of activator to catalyst component ranges from 2:1 to 100,000:1 in one embodiment, and from 10:1 to 10,000:1 in another embodiment, and from 50:1 to 2,000:1 in yet another embodiment. When the activator is a neutral or ionic ionizing activator such as a boron alkyl and the ionic salt of a boron alkyl, the mole ratio of activator to catalyst component ranges from 0.5:1 to 10:1 in one embodiment, and from 1:1 to 5:1 in yet another embodiment.

Method for Supporting

The above described metallocene catalyst compounds and catalyst systems may be combined with one or more support materials or carriers using one of the support methods well known in the art or as described below. In the preferred embodiment, the method of the invention uses a polymerization catalyst in a supported form. For example, in a most preferred embodiment, a metallocene catalyst compound or catalyst system is in a supported form, for example deposited on, contacted with, or incorporated within, adsorbed or absorbed in, or on, a support or carrier.

The terms "support" or "carrier" are used interchangeably and are any support material, preferably a porous support material, for example, talc, inorganic oxides and inorganic chlorides. Other carriers include resinous support materials such as polystyrene, functionalized or crosslinked organic supports, such as polystyrene divinyl benzene polyolefins or polymeric compounds, or any other organic or inorganic support material and the like, or mixtures thereof.

The preferred carriers are inorganic oxides that include those Group 2, 3, 4, 5, 13 or 14 metal oxides. The preferred supports include silica, alumina, silica-alumina, magnesium chloride, and mixtures thereof. Other useful supports include magnesia, titania, zirconia, montmorillonite (EP-B1 0 511 665) and other clays and 'nanoclays', graphite, zeolites and the like. Also, combinations of these support materials may be used, for example, silica-chromium, silica-alumina, silica-titania and the like.

It is preferred that the carrier, most preferably an inorganic oxide, has a surface area in the range of from about 10 to about 700 m$^2$/g, pore volume in the range of from about 0.1 to about 4.0 cc/g and average particle size in the range of from about 5 to about 500 $\mu$m. More preferably, the surface area of the carrier is in the range of from about 50 to about 500 m$^2$/g, pore volume of from about 0.5 to about 3.5 cc/g and average particle size of from about 10 to about 200 $\mu$m. Most preferably the surface area of the carrier is in the range is from about 100 to about 400 m$^2$/g, pore volume from about 0.8 to about 3.0 cc/g and average particle size is from about 5 to about 100 $\mu$m. The average pore size of the carrier of the invention typically has pore size in the range of from 10 to 1000 Å, preferably 50 to about 500 Å, and most preferably 75 to about 350 Å.

Even more preferably, the supports useful in the present invention are silica materials having a surface area of from 200 to 400 m$^2$/g in one embodiment, and from 250 to 350 m$^2$/g in another embodiment, and from 275 to 325 m$^2$/g in yet a more particular embodiment; the pore volume of the preferred silica material ranges from 1 to 2 cm$^3$/g in one embodiment, and from 1.4 to 1.8 cm$^3$/g in another embodiment, and from 1.5 to 1.7 cm$^3$/g in yet another embodiment; and the average particle size (APS) ranges from 35 $\mu$m or less in one embodiment, and from 30 $\mu$m or less in another embodiment, and from 25 $\mu$m or less in yet a more particular embodiment, and from 0.1 to 35 $\mu$m in yet another embodiment, and from 1 to 30 $\mu$m in yet another embodiment, and from 5 to 25 $\mu$m in yet another embodiment, inclusive. The silica as used herein may be dehydrated or calcined by heating under an inert (oxygen- and water-free) atmosphere at from 500 to 1000° C., and desirably between 600 and 900° C.

In one embodiment, the metallocene catalyst compounds of the invention may be deposited on the same or separate supports together with an activator, or the activator may be used in an unsupported form, or may be deposited on a support different from the supported metallocene catalyst compounds of the invention, or any combination thereof. This may be accomplished by any technique commonly used in the art.

There are various other methods in the art for supporting a polymerization catalyst compound or catalyst system of the invention. For example, the metallocene catalyst compound of the invention may contain a polymer bound ligand as described in U.S. Pat. Nos. 5,473,202 and 5,770,755; the metallocene catalyst system of the invention may be spray dried as described in U.S. Pat. No. 5,648,310; the support used with the metallocene catalyst system of the invention is functionalized as described in European publication EP-A-0 802 203, or at least one substituent or leaving group is selected as described in U.S. Pat. No. 5,688,880.

In a preferred embodiment, the invention provides for a supported metallocene catalyst system that limits the use of an antistatic agents or surface modifiers that are typically used in the preparation of the supported catalyst systems.

More particularly, a surface modifier may be advantageously absent from the catalyst system of the invention, particularly from the supported fluorided metallocene catalyst compound. Surface modifiers such as hydroxylated amines and ethoxylated amines are added to catalyst systems or polymerization reactors directly to reduce fouling and generally improve reactor performance. A desirable feature of the present invention is the improved performance of the fluorided metallocene catalyst system and process of the invention in the substantial absence of such a surface modifier. As used herein, "surface modifiers" are compounds such as ethoxylated amines (e.g., Kemamine AS-990 from Ciba), mercaptans (e.g., octylmercaptan), surfactants, sulfonates, Group 1 or 2 cations, and other organic and inorganic additives that are added to the catalyst composition (metallocene, activator and support material) or directly to the reactor to improve reactor performance by, for example, reducing fouling or sheeting of polymer on the inner surfaces of the reactor, or by reducing the formation of large chunks (greater than 1–2 cm diameter/length) of polymer from forming. The surface modifier excludes activator compounds, and in fact, many surface modifiers inhibit catalyst activity. As used herein, "substantially absent" means that the component is not added to the reactor or catalyst system, thus absent; or in another embodiment, if present at all, is present to an extent no greater than 0.5 wt % or less relative to the weight of the catalyst composition.

One method for producing the supported metallocene catalyst system of the invention is described as follows: the metallocene catalyst compound is slurried in a liquid to form a metallocene solution and a separate solution is formed containing an activator and a liquid. The liquid may be any compatible solvent or other liquid capable of forming a solution or the like with the metallocene catalyst compounds and/or activator of the invention. In the most preferred embodiment the liquid is a cyclic aliphatic or aromatic hydrocarbon, most preferably toluene. The metallocene catalyst compound and activator solutions are mixed together and added to a porous support or the porous support is added to the solutions such that the total volume of the metallocene catalyst compound solution and the activator solution or the metallocene catalyst compound and activator solution is less than four times the pore volume of the porous support, more preferably less than three times, even more preferably less than two times; preferred ranges being from 1.1 times to 3.5 times range and most preferably in the 1.2 to 3 times range. The supported metallocene catalyst system may be formed by other suitable methods known in the art.

The mole ratio of the metal of the activator component to the metal of the supported metallocene catalyst compounds are in the range of between 0.3:1 to 1000:1, preferably 20:1 to 800:1, and most preferably 50:1 to 500:1. Where the activator is an ionizing activator such as those based on the anion tetrakis(pentafluorophenyl)boron, the mole ratio of the metal of the activator component to the metal component of the metallocene catalyst is preferably in the range of between 0.3:1 to 3:1. Where an unsupported metallocene catalyst system is utilized, the mole ratio of the metal of the activator component to the metal of the metallocene catalyst compound is in the range of between 0.3:1 to 10,000:1, preferably 100:1 to 5000:1, and most preferably 500:1 to 2000:1.

In one embodiment of the invention, olefin(s), preferably $C_2$ to $C_{30}$ olefin(s) or alpha-olefin(s), preferably ethylene or propylene or combinations thereof are prepolymerized in the presence of the metallocene catalyst system of the invention prior to the main polymerization. The prepolymerization can be carried out batchwise or continuously in gas, solution or slurry phase including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and PCT Publication WO 97/44371.

Polymerization Process

The catalysts and catalyst systems of the invention described above are suitable for use in any polymerization process over a wide range of temperatures and pressures. The temperatures may be in the range of from −60° C. to about 280° C., preferably from 50° C. to about 200° C.; and from 60° C. to 120° C. in yet a more particular embodiment, and from 70° C. to 100° C. in yet another embodiment, and from 80° C. to 95° C. in yet another embodiment, wherein a desirable temperature range includes any combination of any upper limit with any lower limit described herein.

Polymerization processes include solution, gas phase, slurry phase and a high pressure process or a combination thereof. Particularly preferred is a gas phase or slurry phase polymerization of one or more olefins at least one of which is ethylene or propylene, and most preferably, the predominant monomer used is ethylene.

In one embodiment, the process of this invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, 1-butene, 1-pentene, 4-methyl-1-pentene, 1-hexene, 1-octene and 1-decene.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In the most preferred embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In one embodiment, the invention is directed to a polymerization process, particularly a gas phase or slurry phase process, for polymerizing propylene alone or with one or more other monomers including ethylene, and/or other olefins having from 4 to 12 carbon atoms. Polypropylene polymers may be produced using the particularly bridged metallocene catalysts having a fluoride ion (F) or a fluorine containing leaving group.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228).

The reactor pressure in a gas phase process may vary from about atmospheric pressure to about 600 psig in one embodiment; and from 100 psig (690 kPa) to about 500 psig (3448 kPa) in another embodiment, preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary as described above; in a particular embodiment, from about 30° C. to about 120° C., preferably from about 60° C. to about 115° C., more preferably in the range of from about 70° C. to 110° C., and most preferably in the range of from about 70° C. to about 95° C.

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes are described in U.S. Pat. Nos. 4,271,060, 5,001,205, 5,236,998 and 5,589,555.

A preferred process of the invention is where the process, preferably a slurry or gas phase process is operated in the presence of a metallocene catalyst system of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. Nos. 5,712,352 and 5,763,543.

In another preferred embodiment of the process of the invention, the process is operated by introducing a carboxylate metal salt into the reactor and/or contacting a carboxylate metal salt with the metallocene catalyst system of the invention prior to its introduction into the reactor. Carboxylate metal salts include Group 1, 2 and Group 13 metal carboxylates such as, for example, aluminum stearate or magnesium acetate. These carboxylate metal salts are added in an amount of from 0.05 to 2 wt % relative to the catalyst composition (silica, activator and catalyst component) in one embodiment. In yet another embodiment, carboxylate metal salts are advantageously absent from the catalyst composition and/or reactor, meaning that they are not added to the catalyst composition or the polymerization reactor; alternately the carboxylate metal salts may be added in a reduced amount such that they are present to less than 0.05 wt % relative to the catalyst composition.

Polymer Product of the Invention

The polymers produced by the process of the invention can be used in a wide variety of products and end-use applications. The polymers produced by the process of the invention include linear low density polyethylene, elastomers, plastomers, high density polyethylenes, low density polyethylenes, polypropylene and polypropylene copolymers.

The polymers, typically ethylene based polymers, have a density in the range of from 0.86 g/cm$^3$ to 0.97 g/cm$^3$, preferably in the range of from 0.88 g/cm$^3$ to 0.965 g/cm$^3$, more preferably in the range of from 0.900 g/cm$^3$ to 0.96 g/cm$^3$, even more preferably in the range of from 0.905 g/cm$^3$ to 0.95 g/cm$^3$, yet even more preferably in the range from 0.910 g/cm$^3$ to 0.940 g/cm$^3$, and most preferably greater than 0.915 g/cm$^3$, preferably greater than 0.920 g/cm$^3$, and most preferably greater than 0.925 g/cm$^3$.

The polymers produced by the process of the invention typically have a molecular weight distribution, a weight average molecular weight to number average molecular weight ($M_w/M_n$) of greater than 1.5 to about 15, particularly greater than 2 to about 10, more preferably greater than about 2.2 to less than about 8, and most preferably from 2.5 to 8, and even more preferably from 1.8 to 4.

Also, the polymers of the invention typically have a narrow composition distribution as measured by Composition Distribution Breadth Index (CDBI). Further details of determining the CDBI of a copolymer are known to those skilled in the art. See, for example, PCT Patent Application WO 93/03093. The metallocene catalyzed polymers of the invention in one embodiment have CDBI's generally in the range of greater than 50% to 100%, preferably 99%, preferably in the range of 55% to 85%, and more preferably 60% to 80%, even more preferably greater than 60%, still even more preferably greater than 65%. In another embodiment, polymers produced using a metallocene catalyst system of the invention have a CDBI less than 50%, more preferably less than 40%, and most preferably less than 30%.

The polymers of the present invention in one embodiment have a melt index (MI) or ($I_2$) as measured by ASTM-D-

1238-E (190/2.16) in the range from 0.01 dg/min to 1000 dg/min, more preferably from about 0.01 dg/min to about 100 dg/min, even more preferably from about 0.1 dg/min to about 50 dg/min, and most preferably from about 0.1 dg/min to about 10 dg/min, and even more preferably from 0.1 dg/min to 5 dg/min.

The polymers of the invention in an embodiment have a melt index ratio ($I_{21}/I_2$) ($I_{21}$ is measured by ASTM-D-1238-F, [190/21.6]) of from 5 to 300, more preferably from about 10 to less than 250, and from 15 to 200 in yet another embodiment, and from 20 to 180 in yet another embodiment, and from 15 to 30 in yet another embodiment, and from 10 to 40 in yet another embodiment, and from 5 to 50 in yet another embodiment, wherein a desirable range may include any combination of any upper limit with any lower limit.

In yet another embodiment, propylene based polymers are produced in the process of the invention. These polymers include atactic polypropylene, isotactic polypropylene, hemi-isotactic and syndiotactic polypropylene. Other propylene polymers include propylene block or impact copolymers.

The polymers of the invention may be blended and/or coextruded with any other polymer. Non-limiting examples of other polymers include linear low density polyethylenes produced via conventional Ziegler-Natta and/or metallocene catalysis, elastomers, plastomers, high pressure low density polyethylene, high density polyethylenes, polypropylenes and the like.

Polymers produced by the process of the invention and blends thereof are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages thereof, the following examples are offered.

The properties of the polymer were determined by the following test methods: Density is measured in accordance with ASTM-D-1238, and other methods as described herein.

EXAMPLE SET A:

Example 1
Preparation of rac/meso bis(1,3-methylbutylcyclopentadienyl)zirconium difluoride.

To a murky green solution of rac/meso bis(1,3-methylbutylcyclopentadienyl)zirconium dichloride [(1,3-MeBuCp)ZrCl$_2$] (1.00 g, 2.31 mmol, 1.00 eq.) in dichloromethane (10 mL) was added tributyltin fluoride (1.50 g, 4.85 mmol, 2.10 eq.). The reaction rapidly lightened, becoming greenish-yellow. The reaction was stirred 2 hours to give a straw brown mixture which was filtered to give a light brown solution and a small amount of white solid. The solution was then evaporated in vacuo, leaving a soupy brown solid. Pentane (10 mL) was added and the mixture was cooled to −35° C. The mixture was filtered, and the resulting white solid was washed with pentane (3×3 mL) cooled to −35° C. The white solid was dried in vacuo to yield 0.70 g (76%). $^1$H NMR(C$_6$D$_6$): δ 0.86 (t, 6H, CH$_2$CH$_2$CH$_2$CH$_3$), 1.19–1.35 (m, 4H, CH$_2$CH$_2$CH$_2$CH$_3$), 1.37–1.51 (m, 4H, CH$_2$CH$_2$CH$_2$CH$_3$), 2.02 (s, 6H, Me), 2.31–2.43 (m, 2H, CH$_2$CH$_2$CH$_2$CH$_3$), 2.47–2.59 (m, 2H, CH$_2$CH$_2$CH$_2$CH$_3$), 5.55 (m, 2H, Cp-H), 5.63 (m, 2H, Cp-H), 5.72 (br, s, 2H, Cp-H). $^{19}$F NMR(C$_6$D$_6$): meso isomer δ 32.4 (d, $^2$J=30), 33.5 (d, $^2$J=30); rac isomer d 33.0 (s).

Example 2
Preparation of (tetramethylcyclopentadienyl)(propylcyclopentadienyl)zirconium difluoride To a yellow solution of (tetramethylcyclopentadienyl)(propylcyclopentadienyl)zirconium dichloride [(Me$_4$Cp)(PrCp)ZrCl$_2$] (1.00 g, 2.47 mmol, 1.00 eq.) in dichloromethane (10 mL) was added tributyltin fluoride (1.60 g, 5.18 mmol, 2.09 eq.). The reaction quickly lightened, becoming almost colorless with a small amount of tributyltin fluoride still visible. The reaction was stirred 1 h and was then filtered to give a colorless solution and a small amount of white solid. The solution was evaporated in vacuo, leaving a damp, white solid. Pentane (15 mL) was added and the mixture was cooled to −35° C. The mixture was filtered, and resulting white solid was washed with pentane (3×3 mL) cooled to −35° C. The white solid was dried in vacuo to yield 0.88 g (96%). $^1$H NMR(CD$_2$Cl$_2$): δ 0.92 (t, 3H, CH$_2$CH$_2$CH$_3$), 1.55 (m, 2H, CH$_2$CH$_2$CH$_3$), 1.82 (s, 6H, Me), 1.99 (s, 6H, Me), 2.42 (t, 2H, CH$_2$CH$_2$CH$_3$), 5.93 (s, 1H, ring-H), 5.96 (br, m, 2H, ring-H), 6.17 (m, 2H, ring-H). $^{19}$F NMR (CD$_2$Cl$_2$): δ 17.5 (s).

Example 3
Preparation of bis(propylcyclopentadienyl)zirconium difluoride

To a straw yellow solution of bis(propylcyclopentadienyl)zirconium dichloride [(PrCp)$_2$ZrCl$_2$] (1.00 g, 2.66 mmol, 1.00 eq.) in dichloromethane (10 mL) was added tributyltin fluoride (1.72 g, 5.57 mmol, 2.10 eq.). The reaction rapidly lightened, turning almost colorless. The reaction was stirred 1 h and was then filtered to give a colorless solution and a small amount of white solid. The solution was evaporated in vacuo, leaving a damp, white solid. Pentane (10 mL) was added and the mixture was cooled to −35° C. The mixture was filtered, and resulting white solid was washed with pentane (3×3 mL) cooled to −35° C. The white solid was dried in vacuo to yield 0.75 g (82%). $^1$H NMR(CD$_2$Cl$_2$): δ 0.92 (t, 6H, CH$_2$CH$_2$CH$_3$), 1.56 (m, 4H, CH$_2$CH$_2$CH$_3$), 2.44 (t, 4H, CH$_2$CH$_2$CH$_3$), 6.05 (m, 4H, ring-H), 6.30 (m, 4H, ring-H). $^{19}$F NMR(CD$_2$Cl$_2$): δ 20.4 (s).

Example 4
Preparation of supported rac/meso bis(1,3-methylbutylcyclopentadienyl)zirconium difluoride 37.23 g of 30 wt % MAO (methylalumoxane) (available from Albemarle, Memphis, Tenn.) in toluene and 39.00 g toluene were combined to give a clear, colorless solution. The solution was stirred 15 min., then 0.641 g rac/meso bis(1,3-methylbutylcyclopentadienyl)zirconium difluoride [(1,3 MeBuCp)$_2$ZrF$_2$] synthesized in Example 1 was added. The solution turned light yellow and was stirred 15 min. 30.00 g Davison 948 silica (50μ, dried at 600° C.) (available from W.R. Grace Corporation, Davison Division, Baltimore, Md.) was then added and the resulting thick mixture was stirred by hand using a spatula for 10 min. The mixture was dried 20 hours in vacuo to give 41.86 g light yellow, free-flowing solid.

Example 5
Preparation of supported rac/meso bis(1,3-methylbutylcyclopentadienyl)zirconium dichloride Rac/meso bis(1,3-methylbutylcyclopentadienyl) zirconium dichloride of Example 1 was supported in a manner similar to that used in Example 4 except using 37.30 g of 30 wt % MAO and 0.695 g rac/meso bis(1,3-methylbutylcyclopentadienyl)zirconium dichloride, which yielded 41.61 g yellow, free-flowing solid.

Example 6
Preparation of supported (tetramethylcyclopentadienyl) (propylcyclopentadienyl)zirconium difluoride (Tetramethylcyclopentadienyl)(propylcyclopentadienyl) zirconium difluoride synthesized in Example 2 was supported in a manner similar to that used in Example 4 except using 37.15 g of 30 wt % MAO and 0.572 g (tetramethylcyclopentadienyl)(propylcyclopentadienyl)zirconium difluoride, which yielded 41.72 g yellow, free-flowing solid.

Example 7
Preparation of supported (tetramethylcyclopentadienyl) (propylcyclopentadienyl)zirconium dichloride (Tetramethylcyclopentadienyl)(propylcyclopentadienyl) zirconium dichloride of Example 2 was supported in a manner similar to that used in Example 4 except using 37.21 g of 30 wt % MAO and 0.626 g (tetramethylcyclopentadienyl)(propylcyclopentadienyl)zirconium dichloride, which yielded 41.79 g yellow solid.

Example 8
Preparation of supported bis(propylcyclopentadienyl) zirconium difluoride Bis(propylcyclopentadienyl)zirconium difluoride synthesized in Example 3 was supported in a manner similar to that used in Example 4 except using 37.12 g of 30 wt % MAO and 0.550 g bis(propylcyclopentadienyl)zirconium difluoride, which yielded 41.82 g yellow, free-flowing solid.

Example 9
Preparation of supported bis(propylcyclopentadienyl) zirconium dichloride Bis(propylcyclopentadienyl)zirconium dichloride of Example 3 was supported in a manner similar to that used in Example 4 except using 37.18 g of 30 wt % MAO and 0.603 g bis(propylcyclopentadienyl)zirconium dichloride, which yielded 41.40 g light yellow, free-flowing solid.

Example 10
Slurry polymerizations using supported rac/meso bis(1,3-methylbutylcyclopentadienyl)zirconium difluoride To a jacketed, stainless steel 1 liter autoclave previously purged with hot nitrogen and equipped with an inclined-blade impeller and a baffle was added 400 mL isobutane and 30 mL 1-hexene containing 15 µL triethylaluminum. The autoclave was stirred and equilibrated at 85° C. 25 mg supported rac/meso bis(1,3-methylbutylcyclopentadienyl) zirconium difluoride catalyst as prepared in Example 4 was injected into the autoclave using ethylene pressure. The polymerization was maintained at 130 psi (896 kPa) ethylene and 85° C. for 40 min., then the autoclave was vented, cooled and opened. The polymer was isolated and dried overnight under vacuum at 60° C. The yield was 63.26 g. A second run under the same conditions yielded 61.10 g.

Example 11
Slurry polymerizations using supported rac/meso bis(1,3-methylbutylcyclopentadienyl)zirconium dichloride Three polymerizations were run under the same conditions used in Example 10 except 25 mg of the supported rac/meso bis(1,3-methylbutylcyclopentadienyl)zirconium dichloride of Example 5 was used. The polymerizations yielded 40.87 g, 35.01 g and 37.86 g of polymer, respectively.

Example 12
Slurry polymerization using supported (tetramethylcyclopentadienyl)(propylcyclopentadienyl) zirconium difluoride Three polymerizations were run under the same conditions used in Example 10 except 25 mg of supported (tetramethylcyclopentadienyl)(propylcyclopentadienyl) zirconium difluoride of Example 6 was used. The polymerization yielded 74.11 g, 67.74 g and 69.56 g of polymer, respectively.

Example 13
Slurry polymerization using supported (tetramethylcyclopentadienyl)(propylcyclopentadienyl) zirconium dichloride Three polymerizations were run under the same conditions used in Example 10 except 25 mg of supported (tetramethylcyclopentadienyl)(propylcyclopentadienyl) zirconium dichloride of Example 7 was used. The polymerizations yielded 58.04 g, 54.99 g and 56.89 g of polymer, respectively.

Example 14
Slurry polymerization using supported bis (propylcyclopentadienyl)zirconium difluoride Three polymerizations were run under the same conditions used in Example 10 except 25 mg of supported bis(propylcyclopentadienyl)zirconium difluoride of Example 8 was used. The polymerizations yielded 100.31 g, 88.20 g and 110.57 g of polymer, respectively.

Example 15
Slurry polymerization using supported bis (propylcyclopentadienyl)zirconium dichloride Two polymerizations were run under the same conditions used in Example 10 except 25 mg of supported bis (propylcyclopentadienyl)zirconium dichloride of Example 9 was used. The polymerizations yielded 84.20 g and 77.36 g of polymer, respectively.

The slurry polymerization data is tabulated in Table 1.

TABLE 1

| Catalyst | Example | Catalyst Amount | Zr (µmol) | Polymer yield | Catalyst Activity |
|---|---|---|---|---|---|
| rac/meso (1,3 MeBuCp)$_2$ZrF$_2$ | 10A | 25 mg | 0.96 | 63.26 g | 3796 g/g hr |
| rac/meso (1,3 MeBuCp)$_2$ZrF$_2$ | 10B | 25 mg | 0.96 | 61.10 g | 3666 g/g hr |
| rac/meso (1,3 MeBuCp)$_2$ZrCl$_2$ | 11A | 25 mg | 0.96 | 40.87 g | 2452 g/g hr |
| rac/meso (1,3 MeBuCp)$_2$ZrCl$_2$ | 11B | 25 mg | 0.96 | 35.01 g | 2100 g/g hr |
| rac/meso (1,3 MeBuCp)$_2$ZrCl$_2$ | 11C | 25 mg | 0.96 | 37.86 g | 2272 g/g hr |
| (Me$_4$Cp)(PrCp)ZrF$_2$ | 12A | 25 mg | 0.96 | 74.11 g | 4447 g/g hr |
| (Me$_4$Cp)(PrCp)ZrF$_2$ | 12B | 25 mg | 0.96 | 67.74 g | 4064 g/g hr |

TABLE 1-continued

| Catalyst | Example | Catalyst Amount | Zr (μmol) | Polymer yield | Catalyst Activity |
|---|---|---|---|---|---|
| (Me$_4$Cp)(PrCp)ZrF$_2$ | 12C | 25 mg | 0.96 | 69.56 g | 4174 g/g hr |
| (Me$_4$Cp)(PrCp)ZrCl$_2$ | 13A | 25 mg | 0.96 | 58.04 g | 3482 g/g hr |
| (Me$_4$Cp)(PrCp)ZrCl$_2$ | 13B | 25 mg | 0.96 | 54.99 g | 3299 g/g hr |
| (Me$_4$Cp)(PrCp)ZrCl$_2$ | 13C | 25 mg | 0.96 | 56.89 g | 3413 g/g hr |
| (PrCp)$_2$ZrF$_2$ | 14A | 25 mg | 0.96 | 100.31 g | 6019 g/g hr |
| (PrCp)$_2$ZrF$_2$ | 14B | 25 mg | 0.96 | 88.20 g | 5292 g/g hr |
| (PrCp)$_2$ZrF$_2$ | 14C | 25 mg | 0.96 | 110.57 g | 6634 g/g hr |
| (PrCp)$_2$ZrCl$_2$ | 15A | 25 mg | 0.96 | 84.20 g | 5052 g/g hr |
| (PrCp)$_2$ZrCl$_2$ | 15B | 25 mg | 0.96 | 77.36 g | 4642 g/g hr |

Example 16
Gas phase polymerization using supported rac/meso bis(1,3-methylbutylcyclopentadienyl)zirconium difluoride A 1.03 MI, 0.9172 density copolymer was made using supported rac/meso bis(1,3-methylbutylcyclopentadienyl)zirconium difluoride of Example 4 in a continuous fluid bed gas phase reactor having an ethylene concentration of 35 mol % at 300 psig total pressure (2069 kPag) and 175° F. (79° C.). The residence time was 4.1 hours and the catalyst productivity was 2732 g/g.

Example 17
Gas phase polymerization using supported rac/meso bis(1,3-methylbutylcyclopentadienyl)zirconium dichloride A 1.06 MI, 0.9173 density copolymer was made using supported rac/meso bis(1,3-methylbutylcyclopentadienyl)zirconium dichloride of Example 5 in a continuous fluid bed gas phase reactor having an ethylene concentration of 35 mol % at 300 psig total pressure (2069 kPag) and 175° F. (79° C.). The residence time was 4.8 hours and the catalyst productivity was 2309 g/g.

Example 18
Preparation of rac-dimethylsilylbis(tetrahydroindenyl) zirconium difluoride To a murky green-yellow solution of rac-dimethylsilyl-bis(tetrahydro-indenyl)zirconium dichloride [DMS bis(THI) ZrCl$_2$] (1.00 g, 2.19 mmol, 1.00 eq.) in dichloromethane (15 mL) was added tributyltin fluoride (1.42 g, 4.59 mmol, 2.10 eq.). The reaction lightened immediately. The reaction was stirred for one hour and was then filtered to give a straw-yellow solution and a small amount of brownish solid. The solution was then evaporated in vacuo, leaving a manila-colored, thick suspension. The suspension was washed with pentane (20 mL, then 3×5 mL) to give a white, micro crystalline solid. The solid was dried in vacuo to yield 0.76 g (82%). $^1$H NMR (CD$_2$Cl$_2$): δ 0.80 (s, 6H, SiMe$_2$, 1.45–1.9 and 2.4–2.7 (br, m, 16H, aliphatic-ring-H), 5.61 (d, 2H, cyclopentadienyl-ring-H), 6.27 (br, s, 2H, cyclopentadienyl-ring-H). $^{19}$F NMR (CD$_2$Cl$_2$): δ 19.9 (s).

Example 19
Preparation of supported rac-dimethylsilyl bis(tetrahydroindenyl)zirconium dichloride A rac-Dimethylsilyl bis(tetrahydroindenyl)zirconium dichloride of Example 18 was supported in a manner similar to that described in Example 4 except using 37.34 g of 30 wt % MAO and 0.735 g rac-dimethylsilyl bis(tetrahydroindenyl)zirconium dichloride [DMS bis(THI) ZrCl$_2$], which yielded 42.09 g yellow solid.

Example 20
Preparation of supported rac-dimethylsilyl bis(tetrahydroindenyl)zirconium difluoride A rac-Dimethylsilyl bis(tetrahydroindenyl)zirconium difluoride synthesized in Example 18 was supported in a manner similar that described in Example 4 except using 37.28 g of 30 wt % MAO and 0.681 g rac-dimethylsilyl bis(tetrahydroindenyl)zirconium difluoride [DMS bis(THI) ZrF$_2$], which yielded 42.28 g yellow, free-flowing solid.

Example 21
Ethylene slurry polymerization using supported rac-dimethylsilyl bis(tetrahydroindenyl)zirconium difluoride Three polymerizations were run under the same conditions used in Example 10 except 15 mL hexene and 25 mg of supported rac-dimethylsilyl bis(tetrahydroindenyl) zirconium difluoride of Example 20 was used. The polymerizations yielded 42.64 g, 47.57 g and 49.65 g of polymer, respectively. The polymerization results are given in Table 2 below.

Example 22
Ethylene slurry polymerization using supported rac-dimethylsilyl bis(tetrahydroindenyl)zirconium dichloride Three polymerizations were run under the same conditions used in Example 10 except 15 mL hexene and 25 mg supported rac-dimethylsilyl bis(tetrahydroindenyl) zirconium dichloride of Example 19 was used. The polymerizations yielded 39.40 g, 37.16 g, and 38.18 g of polymer, respectively. The polymerization results are given in Table 2 below.

TABLE 2

| Catalyst | Example | Amount | μmol Zr | Polymer Yield | Catalyst Activity |
|---|---|---|---|---|---|
| DMS bis(THI)ZrF$_2$ | 21A | 25 mg | 0.96 | 42.64 g | 2558 g/g hr |
| DMS bis(THI)ZrF$_2$ | 21B | 25 mg | 0.96 | 47.57 g | 2854 g/g hr |
| DMS bis(THI)ZrF$_2$ | 22C | 25 mg | 0.96 | 49.65 g | 2979 g/g hr |
| DMS bis(THI)ZrCl$_2$ | 22A | 25 mg | 0.96 | 39.40 g | 2364 g/g hr |
| DMS bis(THI)ZrCl$_2$ | 22B | 25 mg | 0.96 | 37.16 g | 2230 g/g hr |
| DMS bis(THI)ZrCl$_2$ | 22C | 25 mg | 0.96 | 38.18 g | 2291 g/g hr |

Example 23
Propylene slurry polymerizations using supported rac-dimethylsilyl bis(tetrahydroindenyl)zirconium difluoride To a jacketed, stainless steel 1 liter autoclave previously purged with hot nitrogen and equipped with an inclined-blade impeller and a baffle was added 500 mL liquid propylene and 10 mL pentane containing 20 μL triethylaluminum. The autoclave was stirred and equilibrated at 70° C. 50 mg supported rac-dimethylsilyl bis(tetrahydroindenyl) zirconium difluoride catalyst of Example 20 was injected into the autoclave using 100 mL liquid propylene. The polymerization was maintained at 70° C. for one hour, then the autoclave was vented, cooled and opened. The polymer was isolated and dried overnight under vacuum at 60° C. The polymer yield was 31.79 g. Two additional runs under the same conditions yielded 33.33 g and 33.22 g of polymer, respectively. These polymerization results are given in Table 3 below.

Example 24
Propylene slurry polymerizations using supported rac-dimethylsilyl bis(tetrahydroindenyl)zirconium dichloride.

Three polymerizations were run under the same conditions used in Example 23 except 50 mg of supported rac-dimethylsilyl bis(tetrahydroindenyl)zirconium dichloride of Example 19 was used. The polymerizations yielded 21.76 g, 22.29 g, and 23.20 g of polymer, respectively. The polymerization results are given in Table 3 below.

TABLE 3

| Catalyst | Example | Amount | μmol Zr | Polymer Yield | Catalyst Activity |
|---|---|---|---|---|---|
| DMS bis (THI) $ZrF_2$ | 23A | 50 mg | 1.92 | 31.79 g | 636 g/g hr |
| DMS bis (THI) $ZrF_2$ | 23B | 50 mg | 1.92 | 33.33 g | 667 g/g hr |
| DMS bis (THI) $ZrF_2$ | 23C | 50 mg | 1.92 | 33.22 g | 664 g/g hr |
| DMS bis (THI) $ZrCl_2$ | 24A | 50 mg | 1.92 | 21.76 g | 435 g/g hr |
| DMS bis (THI) $ZrCl_2$ | 24B | 50 mg | 1.92 | 22.29 g | 446 g/g hr |
| DMS bis (THI) $ZrCl_2$ | 24C | 50 mg | 1.92 | 23.20 g | 464 g/g hr |

EXAMPLE SET B:

Supported catalysts that include at least one catalyst component, an activator, and a support material are of interest in olefin polymerization processes. This set of experiments were designed to show the influence of the support material properties on polymerization of olefins using various zirconocenes, both chlorided and fluorided zirconocenes. Also, these experiments show the utility of using the smaller silica and fluorided metallocenes by the absence of fouling when catalyst surface modifiers, such as AS-990, are absent. The "APS" or average particle size of the supports was determined by standard techniques. For example, the APS can be determined using a Malvern instrument, the APS being the material at the 50 percentile range. The support materials used in the following experiments have the following properties (Table 4):

TABLE 4

| | Silica Properties | | |
|---|---|---|---|
| Physical Properties | Davison 948 | Ineos ES-757 | Davison SMR-49-3103 Silica |
| SA ($m^2$/g) | 311 | 316 | 299 |
| PV ($cm^3$/g) | 1.62 | 1.59 | 1.47 |
| APS ($\mu$m) | 55 | 25 | 30 |

The catalyst compositions as described in Example set B include the metallocene identified and an alumoxane activator, both of which were supported on the silicas in Table 4 above. In particular, the catalyst compositions and the polymer produced were tested and synthesized as follows:

Testing

In order to provide a better understanding of the present invention including representative advantages thereof, the following testing was performed:

Density is measured in accordance with ASTM-D-1238.

$I_2$ is measured by ASTM-D-1238-E (190/2.16).

$I_{21}$ is measured by ASTM-D-1238-F (190/21.1).

The Fouling Index in the Tables below illustrates operability of the catalyst. The higher the value the greater the fouling observed. A Fouling Index of zero means substantially no or no visible fouling. A Fouling Index of 1 is indicative of light fouling, where a very light partial coating of polymer on the stirrer blades of a 2 liter slurry isobutane polymerization reactor and/or no reactor body sheeting. A Fouling Index of 2 is indicative of more than light fouling, where the stirrer blades have a heavier, painted-like, coating of polymer and/or the reactor body wall has some sheeting in a band of 1 to 2 inches (2.54 to 5.08 cm) wide on the reactor wall. A Fouling Index of 3 is considered medium fouling, where the stirrer blade has a thicker, latex-like, coating of polymer on the stirrer blade, some soft chunks in the reactor, and/or some reactor body sheeting with a band of 2 to 3 inch (5.08 to 7.62 cm) wide on the reactor wall. A Fouling Index of 4 is evidence of more than medium fouling, where the stirrer has a thick, latex-like, coating, some harder chunks/balls of polymer, and/or the reactor body wall sheeting band is from 3 to 4 inches (7.62 to 10.2 cm) wide. Activity in the Tables below is measured in grams of polyethylene (PE) per gram of polymerization catalyst in one hour (gPE/gCat.h).

Polymerization for Examples 1b to 14b

A 2 liter autoclave reactor under a nitrogen purge was charged with 0.16 mmoles triethylaluminum (TEAL), followed by 60 cc of 1-hexene comonomer and 800 cc of isobutane diluent. The contents of the reactor were heated to 80° C., after which, 100 mg of each of the supported polymerization catalysts prepared above in Example 1 to 8, were each separately polymerized as follows: Each polymerization catalyst was introduced concurrently with ethylene into the reactor to make up a total reactor pressure of 325 psig (2240 kPa). The reactor temperature was maintained at 85° C. and the polymerization was allowed to proceed for 40 min. After 40 minutes the reactor was cooled, ethylene was vented off and the polymer dried and weighed to obtain the polymer yield. Tables 5 and 6 below provides polymerization results, as well as the fouling characteristics observed, and other physical properties of the polymers.

Catalyst Preparation

Example 1b

The metallocene catalyst was supported on 850 lbs (386 kg) of silica (W.R. Grace 948), dehydrated at 600° C. The metallocene was a commercial scale catalyst prepared in a jacketed mixing vessel. An initial charge of 1675 lbs (760 kg) of toluene was added to the mix vessel. This was followed by the addition of 1060 lbs (481 kg) of 30 wt % methyl alumoxane (MAO) in toluene and 92.5 lbs (42 kg) of 25 wt % bis(1,3-Me,n-BuCp)$ZrCl_2$ in toluene. An additional 216 lbs (98 kg) of toluene was added to the vessel to rinse the metallocene feed cylinder, and the mixture was allowed to agitate for 1 hr at ambient conditions. The dried silica was then added to the MAO/metallocene solution and stirring was continued for another 1 hr after which 60 lbs (27.2 kg) of a 10 wt % Kemamine AS-990 (Ciba) solution in toluene was added. An additional 108 lbs (49 kg) of rinse toluene was added and the mixture stirred for 30 min. The resulting slurry was vacuum dried at 175° F. on the jacket to a free flowing powder. The final weight of the dried catalyst was 1250 lbs (567 kg).

Example 2b

In a 125 ml glass vial equipped with a stirring bar and under anaerobic conditions was added 20 ml of toluene, 6.64 ml of a 30 wt % methylaluminoxane (MAO) solution (2.25 g MAO, 0.039 moles) (available from Albemarle Corporation, Baton Rouge, La.). While stirring, 0.136 g of bis(1-methyl-3-n-butyl-cyclopentadienyl)zirconium dichloride dissolved in 2 ml of toluene were added to the glass vial.

The mixture was stirred at room temperature (25° C.) for 15 minutes, after which 5 g of silica of Davison 948 silica (dehydrated at 600° C.) (available from W.R. Grace, Davison Division, Baltimore, Md.) was added to the solution. The mixture was then stirred for 15 minutes after which 0.036 g of Kemamine AS-990 (available from Ciba Corporation) was added and mixing continued for 15 more minutes. The catalyst was then dried at 75° C. until the solid was free flowing.

Example 3b

Prepared similarly to catalyst of EX-2b, except that Ineos ES-757 silica (600° C.) was used instead of Davison 948 silica.

Example 4b

Prepared similarly to catalyst of EX-2b except that Davison SMR-49-3103 (600° C.) silica was used instead of Davison 948 silica.

Example 5b

Prepared similarly to catalyst of EX-3b except that 0.105 g of $(Me_4\text{-}Cp)(n\text{-}Pr\text{-}Cp)ZrCl_2$ metallocene was used instead of $1,3\text{-}(Me, Bu\text{-}Cp)_2ZrCl_2$.

Example 6b

Prepared similarly to catalyst of EX-5b except that the AS-990 addition step was omitted.

Example 7b

Prepared similarly to catalyst of EX-6b except that Davison 948 silica (600° C.) was used instead of Ineos ES-757 silica.

Example 8b

Prepared similarly to catalyst of EX-6b except that Davison SMR-49-3103 (600° C.) silica was used instead of Ineos ES-757 silica.

The data in Table 5 reflects polymerization comparisons of various zirconocene dichlorides with various types of silicas. These results show how, for a given loading of metallocene on a support, the smaller APS support provides improved polymerization activity. More particularly, these data in Table 5 demonstrate the influence of surface modifiers and the support material.

When the surface modifier is present (+), reactor fouling is reduced, but catalyst activity is relatively low. When the surface modifier is absent (−), the catalyst activity increases, but fouling also increases, especially as the activity increases for a given polymerization result. However, catalysts made using smaller APS silica fouled less in the absence of the surface modifier in spite of the higher activity. Examples 1b–5b, and 7b are comparative examples, where either a surface modifier is present at the amount stated, and/or a silica having an APS of greater than 35 μm is used. It can be seen from Examples 6b and 8b that a smaller APS inorganic oxide support shows improvement, even when a surface modifier is not added to the system. Thus, the synergism of having no surface modifier (which acts typically to reduce catalyst activity) and smaller particle size inorganic oxide support materials improves metallocene catalyst performance both in terms of activity and lack of fouling.

TABLE 5

Influence of Support on Polymerization Process using zirconocene-dichlorides

| Example/MCN | wt % Zr | silica type | AS-990 | Activity g PE/g cat · hr (Foul Index) | $I_2$; $I_{21}/I_2$ | Density g/cm³ |
|---|---|---|---|---|---|---|
| 1b/1,3-(Me,Bu-Cp)$_2$ZrCl$_2$ | 0.4 | 1 | + | 2910 (0) | 0.21; 17.1 | 0.914 |
| 2b/1,3-(Me,Bu-Cp)$_2$ZrCl$_2$ | 0.4 | 1 | + | 3630 (0) | 0.19; 18.5 | 0.916 |
| 3b/1,3-(Me,Bu-Cp)$_2$ZrCl$_2$ | 0.4 | 2 | + | 4680 (0) | 0.17; 17.8 | 0.914 |
| 4b/1,3-(Me,Bu-Cp)$_2$ZrCl$_2$ | 0.4 | 3 | + | 4673 (0) | 0.20; 16.8 | 0.915 |
| 5b/(Me$_4$-Cp)(Pr-Cp)ZrCl$_2$ | 0.3 | 2 | + | 5400 (0.5) | 0.22; 17.5 | 0.921 |
| 6b/(Me$_4$-Cp)(Pr-Cp)ZrCl$_2$ | 0.3 | 2 | − | 7020 (1.0) | 0.28; 15.9 | 0.921 |
| 7b/(Me$_4$-Cp)(Pr-Cp)ZrCl$_2$ | 0.3 | 1 | − | 4500 (2.0) | 0.27; 17.4 | 0.920 |
| 8b/(Me$_4$-Cp)(Pr-Cp)ZrCl$_2$ | 0.3 | 3 | − | 6960 (0.5) | 0.23; 18.1 | 0.919 |

1 Davison 948 silica, 55 μm APS.
2 Ineos ES-757 silica, 25 μm APS.
3 Davison SMR-49-3103 silica, 30 μm APS.

Examples 9b–14b

In a 125 ml glass vial equipped with a stirring bar and under anaerobic conditions was added 20 ml of toluene, and 6.64 ml of a 30 wt % methylaluminoxane (MAO) toluene solution (2.25 g neat basis MAO, 0.039 moles) (available from Albemarle Corp. Baton Rouge, La.). While stirring, the appropriate amount and type of fluorided metallocene (see in Table 6), dissolved in 2 ml of toluene were added to the vial containing the MAO solution. The mixture was stirred at ambient temperature for 15 min. after which 5 g of 600° C. dehydrated silica, as shown in Table 6, were added to the solution. After the mixture was stirred for 15 minutes, the supported catalyst was dried at 75° C. with a nitrogen flow until the solid was free flowing. Polymerizations were carried out as described above for Examples 1b–8b.

TABLE 6

Influence of Support on Polymerization Process using MCN-Fluoride

| Example/MCN | wt % Zr | Silica Type | AS-990 | Activity g PE/g cat · hr (fouling index) | $I_2$; $I_{21}/I_2$ | Density g/cm³ |
|---|---|---|---|---|---|---|
| 9b/1,3-(Me,Bu-Cp)$_2$ZrF$_2$ | 0.4 | 1 | − | 5010 (0.5) | 0.17; 18.1 | 0.916 |
| 10b/1,3-(Me,Bu-Cp)$_2$ZrF$_2$ | 0.4 | 2 | − | 7170 (0) | 0.17; 17.8 | 0.915 |
| 11b/1,3-(Me,Bu-Cp)$_2$ZrF$_2$ | 0.4 | 3 | − | 6900 (0) | 0.18; 17.4 | 0.915 |
| 12b/(Me$_4$-Cp)(Pr-Cp)ZrF$_2$ | 0.4 | 1 | − | 6250 (1.0) | 0.28; 16.7 | 0.920 |
| 13b/(Me$_4$-Cp)(Pr-Cp)ZrF$_2$ | 0.4 | 2 | − | 9450 (0) | 0.21; 17.8 | 0.920 |

TABLE 6-continued

Influence of Support on Polymerization Process using MCN-Fluoride

| Example/MCN | wt % Zr | Silica Type | AS-990 | Activity g PE/g cat · hr (fouling index) | $I_2$; $I_{21}/I_2$ | Density g/cm³ |
|---|---|---|---|---|---|---|
| 14b/(Me₄-Cp)(Pr-Cp)ZrF₂ | 0.4 | 3 | – | 8800 (0) | 0.24; 17.3 | 0.920 |

1 Davison 948 silica, 55 μm APS.
2 Ineos ES-757 silica, 25 μm APS.
3 Davison SMR-49-3103 silica, 30 μm APS.

The data in Table 6 reflects polymerization comparisons of various zirconocene difluorides with various types of silicas. These results show how, for a given loading of metallocene on a support, the smaller (e.g., 35 μm or less) APS support provides improved polymerization activity and improved reactor performance (reduced fouling). These results are surprising because the silica surface modifier, AS-990, is absent in all the examples of Table 6, yet no reactor fouling is observed. This demonstrates the advantage of using a difluoride metallocene for polyolefin polymerization, and separately, the advantage of using the smaller APS silica (e.g., 35 μm or less), and finally, the synergistic effect of using both a fluorided metallocene and the smaller APS silica.

To achieve these unexpected results, the catalyst composition and method of the invention preferably include an unbridged fluorided zirconocene compound supported on an inorganic oxide, and even more preferably, an inorganic oxide having an APS of, for example, 35 μm or less, is capable of catalyzing polyolefin production with a fouling index of 1 or less, and preferably 0. Even more preferably, the process that utilizes the catalyst composition of the invention is capable of low fouling rates with no, or reduced usage of surface modifiers; surface modifiers present to less than 0.5 wt % relative to the total weight of the catalyst composition in another embodiment, and preferably not present in the catalyst composition in yet another embodiment, and even more preferably, not present in the catalyst composition or polymerization reactor during the course of polymerization.

Thus, the present invention includes a process of polymerizing olefins comprising contacting:

ethylene and at least one comonomer selected from the group consisting of $C_4$ to $C_8$ alpha olefins; and ethylene and either 1-butene or 1-hexene in another embodiment; and a supported catalyst system comprising a metallocene catalyst compound, the metallocene catalyst compound consisting of a substituted unbridged bis-cyclopentadienyl zirconocene catalyst compound comprising at least one fluoride or fluorine containing leaving group; wherein the polymerization process is a gas phase process, preferably a continuous gas phase process, conducted at a temperature of greater than 70° C. in a reactor capable of producing polymer at a rate of greater than 227 Kg/hr in one embodiment.

In one embodiment, surface modifiers are substantially absent from the process, and present to less than 0.5 wt % relative to the total weight of the catalyst composition in another embodiment; and wherein in a more particular embodiment, ethoxylated amines and glycerol esters having a melting point of between 40° C. and 80° C. are absent from the process and catalyst composition.

The unbridged zirconocene catalyst compound useful in the present invention is represented in one embodiment by the formula:

$$L^A L^B MQ_n$$

wherein M is zirconium; $L^A$ and $L^B$ are bound to M and are the same or different and are selected from the group consisting of substituted versions of the following: cyclopentadienyl ligands, indenyl ligands, tetrahydroindenyl ligands, benzindenyl ligands, fluorenyl ligands, and octahydrofluorenyl ligands; n is 1, 2 or 3; and Q is a monoanionic labile ligand bound to M; wherein at least one Q is fluoride or a fluorine containing leaving group. In one embodiment, all Q's are fluorine. In yet another embodiment, each of $L^A$ and $L^B$ are the same or different and selected from the group consisting of substituted versions of the following: cyclopentadienyl ligands and tetrahydroindenyl ligands, and most preferably, substituted versions of cyclopentadienyl. In yet another embodiment, the substituent group(s) are selected from the group consisting of methyl, ethyl, propyl, butyl, pentyl, hexyl, and isomers and combinations thereof, and more preferably are selected from methyl, ethyl, propyl and butyl groups and isomers and combinations thereof. In another embodiment, the zirconocene catalyst compound is selected from the group consisting of bis(1-butyl-3-methyl-cyclopentadienyl)zirconium difluoride, bis(propylcyclopentadienyl)zirconium difluoride, and (tetramethylcyclopentadienyl)(propylcyclopentadienyl)zirconium difluoride.

The catalyst composition of the invention is useful in any number of olefin polymerization processes, in particular, solution, slurry or gas phase polymerization, and is particularly useful in gas phase polymerization processes, and more preferably, in fluidized bed gas phase processes.

In one embodiment of the invention, the catalyst system comprises an alumoxane activator, and in another embodiment comprises an ionic activator or ionizing activator. Preferably, the activator is supported on a support material with the zirconocene. The support is an inorganic oxide in one embodiment, and preferably, silica. In one embodiment, the support has an average particle size of from less than 35 μm and a pore volume of from 1 to 2 cm³/g; more preferably, an average particle size of less than 30 μm.

In one embodiment of the invention, the process of polymerization is a continuous gas phase process comprises the steps of:
(a) introducing a recycle stream into the reactor, the recycle stream comprising ethylene and alpha olefin monomers;
(b) introducing the supported catalyst system;
(c) withdrawing the recycle stream from the reactor;
(d) cooling the recycle stream;
(e) introducing into the reactor additional monomer(s) to replace the monomer(s) polymerized;
(f) reintroducing the recycle stream or a portion thereof into the reactor; and
(g) withdrawing a polymer product from the reactor.

The polymer product is a copolymer having a density in the range of from 0.900 g/cm³ to 0.960 g/cm³; a MWD of from 2 to 10; and an $I_2$ of from 0.1 dg/min to 50 dg/min in one embodiment, and is a copolymer having a density in the range of from 0.910 g/cm³ to 0.940 g/cm³; a MWD of from 1.8 to 4; and an $I^2$ of from 0.1 dg/min to 10 dg/min in a preferred embodiment. The polymer product has a CDBI value in the range of 55% to 85% in one embodiment, and is suitable for use as a film or in a film laminate.

The catalyst system of the present invention, and method of using the catalyst system of the present invention may include other non-metallocene catalyst compounds capable of catalyzing the polymerization of olefins (e.g., Ziegler-Natta based catalyst compounds of titanium chlorides; non-metallocene chromium catalyst compounds, and Group 4–10 amide and imide type compounds) in one embodiment, and excludes the use of metallocenes other than unbridged bis-cyclopentadienyl zirconocenes comprising at least one fluoride or fluorine containing leaving group. Desirable unbridged bis-cyclopentadienyl zirconocenes comprising at least one fluoride or fluorine containing leaving group include those represented in structures (I), (IIIb), (IIId), (IIIf), (IIIh) and (IIIj). In another embodiment of the process and catalyst composition of the invention, the catalyst composition consists essentially of a silica support possessing an average particle size of 35 μm or less, most preferably from 30 μm or less, and a pore volume of from 1 to 2 cm$^3$/g; the silica supporting an alumoxane, preferably a methalumoxane activator, and an unbridged bis-cyclopentadienyl zirconocenes comprising at least one fluoride or fluorine containing leaving group, preferably comprising two fluoride ions.

While the present invention has been described and illustrated by reference to particular embodiments, those of ordinary skill in the art will appreciate that the invention lends itself to variations not necessarily illustrated herein. For example, it is contemplated that metallocene catalyst compounds of the invention may be introduced into a reactor in a mineral oil slurry, or introduced to the process of the invention to boost activity or productivity, or simply to improve operability of the process. For this reason, then, reference should be made solely to the appended claims for purposes of determining the true scope of the present invention.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

We claim:

1. A process of polymerizing olefins comprising contacting an activator and:
    (a) ethylene and at least one comonomer selected from the group consisting of $C_4$ to $C_8$ alpha olefins; and
    (b) a supported catalyst system comprising a metallocene catalyst compound, the metallocene catalyst compound consisting of a substituted unbridged bis-cyclopentadienyl zirconocene catalyst compound comprising at least one fluoride or fluorine containing leaving group;
    wherein the supported catalyst system comprises a silica support having an average particle size of from 35 μm or less and a pore volume of from 1 to 2 cm$^3$/g;
    wherein the polymerization process is a gas phase process conducted at a temperature of greater than 70° C.

2. The process of claim 1, wherein the metallocene and an activator are supported on an inorganic oxide support material.

3. The process of claim 1, wherein the zirconocene catalyst compound is represented by the formula:

$$L^A L^B M Q_n$$

wherein M is zirconium;

$L^A$ and $L^B$ are bound to M and are the same or different and are selected from the group consisting of substituted versions of the following: cyclopentadienyl ligands, indenyl ligands, tetrahydroindenyl ligands, benzindenyl ligands, fluorenyl ligands, and octahydrofluorenyl ligands;

n is 1, 2 or 3;

Q is a monoanionic labile ligand bound to M; wherein at least one Q is fluoride or a fluorine containing leaving group.

4. The process of claim 3, wherein Q is fluorine.

5. The process of claim 3, wherein each of $L^A$ and $L^B$ are the same or different and selected from the group consisting of substituted versions of the following: cyclopentadienyl ligands and tetrahydroindenyl ligands.

6. The process of claim 3, wherein the substituent group (s) are selected from the group consisting of methyl, ethyl, propyl, butyl, pentyl, hexyl, and isomers thereof.

7. The process of claim 3, where the zirconocene catalyst compound comprises two fluoride leaving groups.

8. The process of claim 1, wherein the zirconocene catalyst compound is selected from the group consisting of bis(1-butyl-3-methyl-cyclopentadienyl)zirconium difluoride, bis(propylcyclopentadienyl)zirconium difluoride, and (tetramethylcyclopentadienyl)(propylcyclopentadienyl)zirconium difluoride.

9. The process of claim 1, wherein the process is operated at a pressure greater than 200 psig (1379 kPa).

10. The process of claim 1, wherein the catalyst system comprises an alumoxane activator.

11. The process of claim 1, wherein the catalyst system comprises an ionic activator or ionizing activator.

12. The process of claim 1, wherein the comonomer is 1-butene or 1-hexene.

13. The process of claim 1, wherein the process conducted at a temperature of greater than 75° C.

14. The process of claim 1, wherein the gas phase process comprises the steps of:
    (a) introducing a recycle stream into the reactor, the recycle stream comprising ethylene and alpha olefin monomers;
    (b) introducing the supported catalyst system;
    (c) withdrawing the recycle stream from the reactor;
    (d) cooling the recycle stream;
    (e) introducing into the reactor additional monomer(s) to replace the monomer(s) polymerized;
    (f) reintroducing the recycle stream or a portion thereof into the reactor; and
    (g) withdrawing a polymer product from the reactor.

15. The process of claim 14, wherein the polymer product is a copolymer having a density in the range of from 0.900 g/cm$^3$ to 0.960 g/cm$^3$; a MWD of from 2 to 10; and an $I_2$ of from 0.1 dg/min to 50 dg/min.

16. The process of claim 14, wherein the polymer product is a copolymer having a density in the range of from 0.910 g/cm$^3$ to 0.940 g/cm$^3$; a MWD of from 1.8 to 4; and an $I_2$ of from 0.1 dg/min to 10 dg/min.

17. The process of claim 14, wherein the polymer product has a CDBI value in the range of 55% to 85%.

18. The process of claim 14, wherein a film is formed from the polymer product.

19. A process of polymerizing olefins comprising contacting an activator and:
    (a) ethylene and at least one comonomer selected from the group consisting of $C_4$ to $C_8$ alpha olefins; and
    (b) a supported catalyst system comprising a metallocene catalyst compound, the metallocene catalyst compound consisting of a substituted unbridged bis-cyclopentadienyl zirconocene catalyst compound comprising at least one fluoride or fluorine containing leaving group;
wherein the supported catalyst system comprises a silica support having an average particle size of from 35 μm or less and a pore volume of from 1 to 2 cm³/g.

20. The process of claim 19, wherein surface modifiers are substantially absent.

21. The process of claim 19, wherein the zirconocene catalyst compound is represented by the formula:

$$L^A L^B MQ_n$$

wherein M is zirconium;
$L^A$ and $L^B$ are bound to M and are the same or different and are selected from the group consisting of substituted versions of the following: cyclopentadienyl ligands, indenyl ligands, tetrahydroindenyl ligands, benzindenyl ligands, fluorenyl ligands, and octahydrofluorenyl ligands;
n is 1, 2 or 3;
Q is a monoanionic labile ligand bound to M; wherein at least one Q is fluoride or a fluorine containing leaving group.

22. The process of claim 21, wherein Q is fluorine.

23. The process of claim 21, wherein each of $L^A$ and $L^B$ are the same or different and selected from the group consisting of substituted versions of the following: cyclopentadienyl ligands and tetrahydroindenyl ligands.

24. The process of claim 21, wherein the substituent group(s) are selected from the group consisting of methyl, ethyl, propyl, butyl, pentyl, hexyl, and isomers thereof.

25. The process of claim 19, where the zirconocene catalyst compound comprises two fluoride leaving groups.

26. The process of claim 19, wherein the zirconocene catalyst compound is selected from the group consisting of bis(1-butyl-3-methyl-cyclopentadienyl)zirconium difluoride, bis(propylcyclopentadienyl)zirconium difluoride, and (tetramethylcyclopentadienyl)(propylcyclopentadienyl)zirconium difluoride.

27. The process of claim 19, wherein the catalyst system comprises a supported activator.

28. The process of claim 19, wherein the catalyst system comprises an alumoxane.

29. The process of claim 19, wherein the catalyst system comprises an ionic activator or ionizing activator.

30. The process of claim 19, wherein the comonomer is 1-butene or 1-hexene.

31. The process of claim 19, wherein the process conducted at a temperature of greater than 75° C.

32. The process of claim 19, wherein the average particle size of the support is from 30 μm or less.

33. The process of claim 19, wherein the process is a continuous gas phase process comprising the steps of:
(a) introducing a recycle stream into the reactor, the recycle stream comprising ethylene and alpha olefin monomers;
(b) introducing the supported catalyst system;
(c) withdrawing the recycle stream from the reactor;
(d) cooling the recycle stream;
(e) introducing into the reactor additional monomer(s) to replace the monomer(s) polymerized;
(f) reintroducing the recycle stream or a portion thereof into the reactor; and
(g) withdrawing a polymer product from the reactor.

34. The process of claim 33, wherein the polymer product is a copolymer having a density in the range of from 0.900 g/cm³ to 0.960 g/cm³; a MWD of from 2 to 10; and an $I_2$ of from 0.1 dg/min to 50 dg/min.

35. The process of claim 33, wherein the polymer product is a copolymer having a density in the range of from 0.910 g/cm³ to 0.940 g/cm³; a MWD of from 1.8 to 4; and an $I_2$ of from 0.1 dg/min to 10 dg/min.

36. The process of claim 33, wherein a film is formed from the polymer product.

37. The process of claim 33, wherein the polymer product has a CDBI value in the range of 55% to 85%.

38. A process of polymerizing olefins comprising contacting in a reactor an activator and:
(a) ethylene and at least one comonomer selected from the group consisting of $C_4$ to $C_8$ alpha olefins; and
(b) a supported catalyst system comprising a metallocene catalyst compound, the metallocene catalyst compound consisting of a substituted bridged and unbridged bis-cyclopentadienyl zirconocene or hafnocene catalyst compounds comprising at least one fluoride or fluorine containing leaving group; the supported catalyst system comprising an inorganic oxide support having an average particle size of from 35 μm or less
wherein the fouling index is maintained at 0.5 or less in the polymerization reactor.

39. The process of claim 38, wherein the zirconocene catalyst compound is represented by the formulas:

$$L^A L^B MQ_n \text{ and } L^A(A)L^B MQ_n$$

wherein M is zirconium or hafnium;
$L^A$ and $L^B$ are bound to M and are the same or different and are selected from the group consisting of substituted versions of the following: cyclopentadienyl ligands, indenyl ligands, tetrahydroindenyl ligands, benzindenyl ligands, fluorenyl ligands, and octahydrofluorenyl ligands;
A is a divalent bridging group bound to $L^A$ and $L^B$;
n is 1, 2 or 3;
Q is a monoanionic labile ligand bound to M; wherein at least one Q is fluoride or a fluorine containing leaving group.

40. The process of claim 39, wherein Q is fluorine.

41. The process of claim 39, wherein each of $L^A$ and $L^B$ are the same or different and selected from the group consisting of substituted versions of the following: cyclopentadienyl ligands and tetrahydroindenyl ligands.

42. The process of claim 39, wherein the substituent group(s) are selected from the group consisting of methyl, ethyl, propyl, butyl, pentyl, hexyl, and isomers thereof.

43. The process of claim 38, wherein the catalyst compound is selected from the group consisting of dimethylsilylbis(tetrahydroindenyl)zirconium difluoride, bis(1-butyl-3-methyl-cyclopentadienyl)zirconium difluoride, bis(propylcyclopentadienyl)zirconium difluoride, and (tetramethylcyclopentadienyl)(propylcyclopentadienyl)zirconium difluoride.

44. The process of claim 38, wherein the catalyst system comprises a supported activator.

45. The process of claim 38, wherein the catalyst system comprises an alumoxane.

46. The process of claim 38, wherein the catalyst system comprises an ionic activator or ionizing activator.

47. The process of claim 38, wherein the comonomer is 1-butene or 1-hexene.

48. The process of claim 38, wherein the process conducted at a temperature of greater than 75° C.

49. The process of claim 38, wherein the average particle size of the support is from 30 µm or less.

50. The process of claim 38, wherein the process is a continuous gas phase process comprising the steps of:
  (a) introducing a recycle stream into the reactor, the recycle stream comprising ethylene and alpha olefin monomers;
  (b) introducing the supported catalyst system;
  (c) withdrawing the recycle stream from the reactor;
  (d) cooling the recycle stream;
  (e) introducing into the reactor additional monomer(s) to replace the monomer(s) polymerized;
  (f) reintroducing the recycle stream or a portion thereof into the reactor; and
  (g) withdrawing a polymer product from the reactor.

51. The process of claim 50, wherein the polymer product is a copolymer having a density in the range of from 0.900 g/cm$^3$ to 0.960 g/cm$^3$; a MWD of from 2 to 10; and an $I_2$ of from 0.1 dg/min to 50 dg/min.

52. The process of claim 50, wherein the polymer product is a copolymer having a density in the range of from 0.910 g/cm$^3$ to 0.940 g/cm$^3$; a MWD of from 1.8 to 4; and an $I_2$ of from 0.1 dg/min to 10 dg/min.

53. The process of claim 50, wherein a film is formed from the polymer product.

54. The process of claim 50, wherein the polymer product has a CDBI value in the range of 55% to 85%.

55. The process of claim 38, wherein the support is silica having an average particle size of 30 µm or less.

* * * * *